(12) United States Patent
Hafezi

(10) Patent No.: US 8,786,049 B2
(45) Date of Patent: Jul. 22, 2014

(54) SOLID-STATE THIN-FILM CAPACITOR

(75) Inventor: Hooman Hafezi, Redwood City, CA (US)

(73) Assignee: Proteus Digital Health, Inc., Redwood City, CA (US)

( * ) Notice: Subject to any disclaimer, the term of this patent is extended or adjusted under 35 U.S.C. 154(b) by 0 days.

(21) Appl. No.: 13/260,078

(22) PCT Filed: Jul. 23, 2010

(86) PCT No.: PCT/US2010/043128
§ 371 (c)(1),
(2), (4) Date: Sep. 23, 2011

(87) PCT Pub. No.: WO2011/011736
PCT Pub. Date: Jan. 27, 2011

(65) Prior Publication Data
US 2012/0018844 A1    Jan. 26, 2012

Related U.S. Application Data

(60) Provisional application No. 61/228,027, filed on Jul. 23, 2009.

(51) Int. Cl.
*H01L 21/02*    (2006.01)

(52) U.S. Cl.
USPC .......... 257/532; 257/753; 257/310; 257/311; 257/295; 257/296; 438/780; 361/311; 607/119

(58) Field of Classification Search
USPC ................ 257/532, 753, 310–311, 295–296; 438/780; 361/311; 607/119
See application file for complete search history.

(56) References Cited

U.S. PATENT DOCUMENTS 2,956,586 A    10/1960   Zeigler et al.
3,397,446 A *   8/1968   Sharp .................... 29/25.03
(Continued)

FOREIGN PATENT DOCUMENTS

EP    0659388    6/1995
EP    1048321    11/2000
(Continued)

OTHER PUBLICATIONS

Auricchio et al., "The Pacing Therapies for Congestive Heart Failure (PATH-CHF) Study: Rationale, Design and Endpoints of a Prospective Randomized Multicenter Study" Am J. Cardio.: 83:130D-135D (1999).

(Continued)

*Primary Examiner* — Fernando L Toledo
*Assistant Examiner* — Mohammed Shamsuzzaman
(74) *Attorney, Agent, or Firm* — Bozicevic, Field & Francis LLP; Bret E. Field

(57) ABSTRACT

Solid-state thin-film capacitors are provided. Aspects of the solid-state thin-film capacitors include a first electrode layer of a transition metal, a dielectric layer of an oxide of the transition metal, and a second electrode layer of a metal oxide. Also provided are methods of making the solid-state thin-film capacitors, as well as devices that include the same. The capacitor may have one or more cathodic arc produced structures, i.e., structures produced using a cathodic arc deposition process. The structures may be stress-free metallic structures, porous layers and layers displaying crenulations. Aspects of the invention further include methods of producing capacitive structures using chemical vapor deposition and/or by sputter deposition.

18 Claims, 10 Drawing Sheets

(56) References Cited

U.S. PATENT DOCUMENTS

| | | | |
|---|---|---|---|
| 3,888,260 A | 6/1975 | Fischell | |
| 3,943,936 A | 3/1976 | Rasor et al. | |
| 3,985,123 A | 10/1976 | Herzlinger et al. | |
| 4,164,946 A | 8/1979 | Langer | |
| 4,262,982 A | 4/1981 | Kenny | |
| 4,397,314 A | 8/1983 | Vaguine | |
| 4,399,820 A | 8/1983 | Wirtzfeld et al. | |
| 4,600,454 A | 7/1986 | Plummer | |
| 4,603,705 A | 8/1986 | Spelcher et al. | |
| 4,628,934 A | 12/1986 | Pohndorf et al. | |
| 4,628,935 A | 12/1986 | Jones et al. | |
| 4,750,494 A | 6/1988 | King | |
| 4,776,334 A | 10/1988 | Prionas | |
| 4,815,469 A | 3/1989 | Chambers | |
| 4,815,472 A | 3/1989 | Wise et al. | |
| 4,877,032 A | 10/1989 | Heinze et al. | |
| 4,878,898 A | 11/1989 | Griffin et al. | |
| 4,881,410 A | 11/1989 | Wise et al. | |
| 4,902,273 A | 2/1990 | Choy et al. | |
| 5,004,275 A | 4/1991 | Miller | |
| 5,005,613 A | 4/1991 | Stanley | |
| 5,035,246 A | 7/1991 | Heuvelmans et al. | |
| 5,072,737 A | 12/1991 | Goulding | |
| 5,103,818 A | 4/1992 | Maston et al. | |
| 5,111,816 A | 5/1992 | Pless et al. | |
| 5,113,868 A | 5/1992 | Wise et al. | |
| 5,119,852 A | 6/1992 | Von Benda | |
| 5,156,154 A | 10/1992 | Valenta, Jr. et al. | |
| 5,158,536 A | 10/1992 | Sekins et al. | |
| 5,176,619 A | 1/1993 | Segalowitz | |
| 5,181,975 A | 1/1993 | Pollack et al. | |
| 5,188,106 A | 2/1993 | Nappholz et al. | |
| 5,209,238 A | 5/1993 | Sundhar | |
| 5,213,098 A | 5/1993 | Bennett et al. | |
| 5,243,981 A | 9/1993 | Hudrlick | |
| 5,285,744 A | 2/1994 | Grantham et al. | |
| 5,304,208 A | 4/1994 | Inuaggiato et al. | |
| 5,305,745 A | 4/1994 | Zacouto | |
| 5,313,020 A | 5/1994 | Sackett | |
| 5,314,458 A | 5/1994 | Najafi et al. | |
| 5,318,591 A | 6/1994 | Causey, III et al. | |
| 5,318,855 A | 6/1994 | Glovatsky et al. | |
| 5,391,199 A | 2/1995 | Ben-Haim | |
| 5,411,532 A | 5/1995 | Mortazavi | |
| 5,411,537 A | 5/1995 | Munshi et al. | |
| 5,417,717 A | 5/1995 | Salo et al. | |
| 5,419,767 A | 5/1995 | Eggers et al. | |
| 5,423,323 A | 6/1995 | Orth | |
| 5,433,198 A | 7/1995 | Desai | |
| 5,476,485 A | 12/1995 | Weinberg et al. | |
| 5,487,752 A | 1/1996 | Salo et al. | |
| 5,490,323 A | 2/1996 | Thacker et al. | |
| 5,509,411 A | 4/1996 | Littmann et al. | |
| 5,515,848 A | 5/1996 | Corbett, III et al. | |
| 5,535,752 A | 7/1996 | Halperin et al. | |
| 5,544,656 A | 8/1996 | Pitsillides et al. | |
| 5,549,650 A | 8/1996 | Bornzin et al. | |
| 5,551,553 A | 9/1996 | Hay | |
| 5,579,234 A | 11/1996 | Wiley et al. | |
| 5,579,764 A | 12/1996 | Goldreyer | |
| 5,591,142 A | 1/1997 | Van Erp | |
| 5,593,430 A | 1/1997 | Renger | |
| 5,628,777 A | 5/1997 | Moberg et al. | |
| 5,662,587 A | 9/1997 | Grundfest et al. | |
| 5,674,258 A | 10/1997 | Henschel et al. | |
| 5,676,153 A | 10/1997 | Smith et al. | |
| 5,683,429 A | 11/1997 | Mehra | |
| 5,713,937 A | 2/1998 | Nappholz et al. | |
| 5,720,768 A | 2/1998 | Verboven-Nelisssen | |
| 5,743,267 A | 4/1998 | Nikolic et al. | |
| 5,751,050 A | 5/1998 | Ishikawa et al. | |
| 5,755,759 A | 5/1998 | Cogan | |
| 5,772,108 A | 6/1998 | Ruggiere, Sr. et al. | |
| 5,788,647 A | 8/1998 | Eggers | |
| 5,797,903 A | 8/1998 | Swanson et al. | |
| 5,800,460 A | 9/1998 | Powers et al. | |
| 5,800,465 A | 9/1998 | Thompson et al. | |
| 5,810,735 A | 9/1998 | Halperin et al. | |
| 5,814,089 A | 9/1998 | Stokes et al. | |
| 5,836,987 A | 11/1998 | Baumann et al. | |
| 5,860,964 A | 1/1999 | Willekens et al. | |
| 5,867,361 A | 2/1999 | Wolf et al. | |
| 5,873,849 A | 2/1999 | Bernard | |
| 5,902,234 A | 5/1999 | Webb | |
| 5,902,248 A | 5/1999 | Millar et al. | |
| 5,913,814 A | 6/1999 | Zantos | |
| 5,924,997 A | 7/1999 | Campbell | |
| 5,925,069 A | 7/1999 | Graves et al. | |
| 5,935,084 A | 8/1999 | Southworth | |
| 5,938,690 A | 8/1999 | Law et al. | |
| 5,941,904 A | 8/1999 | Johnston et al. | |
| 5,957,957 A | 9/1999 | Sheldon | |
| 5,963,429 A | 10/1999 | Chen | |
| 5,983,126 A | 11/1999 | Wittkampf | |
| 5,991,661 A | 11/1999 | Park et al. | |
| 5,999,848 A | 12/1999 | Gord et al. | |
| 5,999,849 A | 12/1999 | Gord et al. | |
| 6,002,963 A | 12/1999 | Mouchawar et al. | |
| 6,004,269 A | 12/1999 | Crowley et al. | |
| 6,009,349 A | 12/1999 | Mouchawar et al. | |
| 6,015,386 A | 1/2000 | Kensey et al. | |
| 6,024,704 A | 2/2000 | Meador et al. | |
| 6,032,699 A | 3/2000 | Cochran et al. | |
| 6,033,398 A | 3/2000 | Farley et al. | |
| 6,038,480 A | 3/2000 | Hrdlicka et al. | |
| 6,044,297 A | 3/2000 | Sheldon et al. | |
| 6,044,299 A | 3/2000 | Nilsson | |
| 6,051,017 A | 4/2000 | Loeb et al. | |
| 6,058,329 A | 5/2000 | Salo et al. | |
| 6,061,593 A | 5/2000 | Fischell et al. | |
| 6,075,691 A | 6/2000 | Duenas et al. | |
| 6,077,136 A | 6/2000 | Arai et al. | |
| 6,078,830 A | 6/2000 | Levin et al. | |
| 6,081,748 A | 6/2000 | Struble et al. | |
| 6,083,216 A | 7/2000 | Fischer et al. | |
| 6,115,626 A | 9/2000 | Whayne et al. | |
| 6,115,636 A | 9/2000 | Ryan | |
| 6,120,442 A | 9/2000 | Hickey | |
| 6,141,588 A | 10/2000 | Cox et al. | |
| 6,141,593 A | 10/2000 | Patag | |
| 6,155,267 A | 12/2000 | Nelson | |
| 6,163,716 A | 12/2000 | Edwards et al. | |
| 6,163,725 A | 12/2000 | Peckham et al. | |
| 6,165,135 A | 12/2000 | Neff | |
| 6,171,252 B1 | 1/2001 | Roberts | |
| 6,184,785 B1 | 2/2001 | Midorikawa | |
| 6,197,021 B1 | 3/2001 | Panescu et al. | |
| 6,197,677 B1 | 3/2001 | Lee et al. | |
| 6,206,835 B1 | 3/2001 | Spillman, Jr. et al. | |
| 6,206,874 B1 | 3/2001 | Ubby et al. | |
| 6,214,032 B1 | 4/2001 | Loeb et al. | |
| 6,223,080 B1 | 4/2001 | Thompson | |
| 6,234,973 B1 | 5/2001 | Meador et al. | |
| 6,245,092 B1 | 6/2001 | Schaldach, Jr. | |
| 6,259,937 B1 * | 7/2001 | Schulman et al. | 600/345 |
| 6,264,606 B1 | 7/2001 | Ekwall et al. | |
| 6,266,567 B1 | 7/2001 | Ishikawa et al. | |
| 6,274,224 B1 * | 8/2001 | O'Bryan et al. | 428/209 |
| 6,277,078 B1 | 8/2001 | Porat et al. | |
| 6,287,256 B1 | 9/2001 | Park et al. | |
| 6,289,250 B1 | 9/2001 | Tsuboi et al. | |
| 6,299,582 B1 | 10/2001 | Brockway et al. | |
| 6,301,500 B1 | 10/2001 | Van Herck et al. | |
| 6,309,350 B1 | 10/2001 | VanTassel et al. | |
| 6,309,385 B1 | 10/2001 | Simpson | |
| 6,328,699 B1 | 12/2001 | Eigler et al. | |
| 6,360,123 B1 | 3/2002 | Kimchi et al. | |
| 6,363,279 B1 | 3/2002 | Ben-Haim et al. | |
| 6,366,811 B1 | 4/2002 | Carlson | |
| 6,370,431 B1 | 4/2002 | Stoop et al. | |
| 6,406,677 B1 | 6/2002 | Carter et al. | |
| 6,418,348 B1 | 7/2002 | Witte | |
| 6,421,567 B1 | 7/2002 | Witte | |
| 6,438,408 B1 | 8/2002 | Mulligan et al. | |

(56) References Cited

U.S. PATENT DOCUMENTS

| | | |
|---|---|---|
| 6,466,820 B1 | 10/2002 | Juran et al. |
| 6,473,638 B2 | 10/2002 | Ferek-Petric |
| 6,473,653 B1 | 10/2002 | Schallhorn et al. |
| 6,477,395 B2 | 11/2002 | Schulman et al. |
| 6,477,417 B1 | 11/2002 | Levine |
| 6,484,057 B2 | 11/2002 | Ideker et al. |
| 6,484,727 B1 | 11/2002 | Vaska et al. |
| 6,496,730 B1 | 12/2002 | Kleckner et al. |
| 6,580,946 B2 | 6/2003 | Struble |
| 6,584,362 B1 | 6/2003 | Scheiner et al. |
| 6,600,954 B2 | 7/2003 | Cohen et al. |
| 6,611,714 B1 | 8/2003 | Mo |
| 6,625,493 B2 | 9/2003 | Kroll et al. |
| 6,628,989 B1 | 9/2003 | Penner et al. |
| 6,631,555 B1 | 10/2003 | Youker et al. |
| 6,643,546 B2 | 11/2003 | Mathis et al. |
| 6,666,826 B2 | 12/2003 | Salo et al. |
| 6,728,562 B1 | 4/2004 | Budd et al. |
| 6,812,796 B2 | 11/2004 | Pryanishnikov et al. |
| 6,885,889 B2 | 4/2005 | Chinchoy |
| 6,934,584 B1 | 8/2005 | Wong et al. |
| 6,957,107 B2 | 10/2005 | Rogers et al. |
| 6,973,718 B2 | 12/2005 | Sheppard et al. |
| 6,978,184 B1 | 12/2005 | Marcus et al. |
| 6,993,384 B2 | 1/2006 | Bradley et al. |
| 6,994,676 B2 | 2/2006 | Mulligan et al. |
| 7,047,084 B2 | 5/2006 | Erickson et al. |
| 7,096,070 B1 | 8/2006 | Jenkins et al. |
| 7,161,793 B2 * | 1/2007 | Kurihara et al. ........... 361/306.3 |
| 7,174,218 B1 | 2/2007 | Kuzma |
| 7,200,437 B1 | 4/2007 | Nabutovsky et al. |
| 7,200,439 B2 | 4/2007 | Zdeblick et al. |
| 7,204,798 B2 | 4/2007 | Zdeblick et al. |
| 7,214,189 B2 | 5/2007 | Zdeblick et al. |
| 7,267,649 B2 | 9/2007 | Zdeblick et al. |
| 7,270,669 B1 | 9/2007 | Sra |
| 7,294,334 B1 | 11/2007 | Michal et al. |
| 7,467,016 B2 | 12/2008 | Colborn |
| 7,473,652 B2 * | 1/2009 | Bai et al. ..................... 438/780 |
| 7,591,792 B2 | 9/2009 | Bouton |
| 7,673,679 B2 | 3/2010 | Harrison et al. |
| 7,892,675 B1 | 2/2011 | Tsukamoto |
| 2001/0000187 A1 | 4/2001 | Peckham et al. |
| 2001/0002924 A1 | 6/2001 | Tajima |
| 2001/0015884 A1 | 8/2001 | Takeshima et al. |
| 2001/0025192 A1 | 9/2001 | Gerber et al. |
| 2001/0047138 A1 | 11/2001 | Kokate et al. |
| 2001/0053882 A1 | 12/2001 | Haddock et al. |
| 2002/0026183 A1 | 2/2002 | Simpson |
| 2002/0040236 A1 | 4/2002 | Lau et al. |
| 2002/0045921 A1 | 4/2002 | Wolinsky et al. |
| 2002/0077568 A1 | 6/2002 | Haddock |
| 2002/0077673 A1 | 6/2002 | Penner et al. |
| 2002/0095196 A1 | 7/2002 | Linberg |
| 2002/0099419 A1 | 7/2002 | Cohen et al. |
| 2002/0099430 A1 | 7/2002 | Verness |
| 2002/0111560 A1 | 8/2002 | Kokate et al. |
| 2002/0120186 A1 | 8/2002 | Keimel |
| 2002/0151816 A1 | 10/2002 | Rich et al. |
| 2002/0156417 A1 | 10/2002 | Rich et al. |
| 2002/0161307 A1 | 10/2002 | Yu et al. |
| 2002/0165589 A1 | 11/2002 | Imran et al. |
| 2002/0169445 A1 | 11/2002 | Jain et al. |
| 2002/0193859 A1 | 12/2002 | Schulman et al. |
| 2003/0036773 A1 | 2/2003 | Whitehurst et al. |
| 2003/0040779 A1 | 2/2003 | Engmark et al. |
| 2003/0045920 A1 | 3/2003 | Belden et al. |
| 2003/0065364 A1 | 4/2003 | Wellman et al. |
| 2003/0078623 A1 | 4/2003 | Weinberg et al. |
| 2003/0105496 A1 | 6/2003 | Yu et al. |
| 2003/0135248 A1 | 7/2003 | Stypulkowski |
| 2003/0153952 A1 | 8/2003 | Auricchio et al. |
| 2003/0191502 A1 | 10/2003 | Sharma et al. |
| 2003/0204233 A1 | 10/2003 | Laske et al. |
| 2003/0216800 A1 | 11/2003 | Ebert et al. |
| 2003/0233134 A1 | 12/2003 | Greenberg et al. |
| 2004/0024440 A1 | 2/2004 | Cole |
| 2004/0039417 A1 | 2/2004 | Soykan et al. |
| 2004/0044368 A1 | 3/2004 | Prinzen et al. |
| 2004/0093053 A1 | 5/2004 | Gerber et al. |
| 2004/0097965 A1 | 5/2004 | Gardeski et al. |
| 2004/0098074 A1 | 5/2004 | Erickson et al. |
| 2004/0130849 A1 * | 7/2004 | Kurihara et al. .............. 361/311 |
| 2004/0143154 A1 | 7/2004 | Lau et al. |
| 2004/0161528 A1 | 8/2004 | Martinez et al. |
| 2004/0193021 A1 | 9/2004 | Zdeblick et al. |
| 2004/0199235 A1 | 10/2004 | Younis |
| 2004/0215049 A1 | 10/2004 | Zdeblick et al. |
| 2004/0220637 A1 | 11/2004 | Zdeblick et al. |
| 2004/0254483 A1 | 12/2004 | Zdeblick et al. |
| 2004/0260346 A1 | 12/2004 | Overall et al. |
| 2005/0027320 A1 | 2/2005 | Nehls et al. |
| 2005/0038481 A1 | 2/2005 | Chinchoy et al. |
| 2005/0054892 A1 | 3/2005 | Lau et al. |
| 2005/0075677 A1 | 4/2005 | Ganion et al. |
| 2005/0075683 A1 | 4/2005 | Miesel et al. |
| 2005/0102011 A1 | 5/2005 | Lau et al. |
| 2005/0111162 A1 | 5/2005 | Osaka et al. |
| 2005/0246004 A1 | 11/2005 | Cameron et al. |
| 2005/0267542 A1 | 12/2005 | David et al. |
| 2006/0002097 A1 | 1/2006 | Borland et al. |
| 2006/0035147 A1 | 2/2006 | Lam et al. |
| 2006/0058588 A1 | 3/2006 | Zdeblick |
| 2006/0122678 A1 | 6/2006 | Olsen et al. |
| 2006/0161211 A1 | 7/2006 | Thompson et al. |
| 2006/0170486 A1 | 8/2006 | Tranchina et al. |
| 2006/0247539 A1 | 11/2006 | Schugt et al. |
| 2006/0264775 A1 | 11/2006 | Mills et al. |
| 2006/0265038 A1 | 11/2006 | Hagen et al. |
| 2007/0100399 A1 | 5/2007 | Parramon et al. |
| 2007/0123944 A1 | 5/2007 | Zdeblick |
| 2007/0135721 A1 | 6/2007 | Zdeblick |
| 2007/0173896 A1 | 7/2007 | Zdeblick |
| 2007/0179569 A1 | 8/2007 | Zdeblick |
| 2007/0198066 A1 | 8/2007 | Greenberg et al. |
| 2007/0203517 A1 | 8/2007 | Williams et al. |
| 2007/0219591 A1 | 9/2007 | Zdeblick et al. |
| 2007/0219608 A1 | 9/2007 | Swoyer et al. |
| 2007/0255336 A1 | 11/2007 | Herbert et al. |
| 2007/0255373 A1 | 11/2007 | Metzler et al. |
| 2007/0255460 A1 | 11/2007 | Lopata |
| 2008/0007186 A1 | 1/2008 | Lu et al. |
| 2008/0021292 A1 | 1/2008 | Stypulkowski |
| 2008/0027289 A1 | 1/2008 | Zdeblick |
| 2008/0039916 A1 | 2/2008 | Colliou et al. |
| 2008/0045826 A1 | 2/2008 | Greenberg et al. |
| 2008/0058656 A1 | 3/2008 | Costello et al. |
| 2008/0061630 A1 | 3/2008 | Andreu et al. |
| 2008/0091246 A1 | 4/2008 | Carey et al. |
| 2008/0097227 A1 | 4/2008 | Zdeblick et al. |
| 2008/0097566 A1 | 4/2008 | Colliou |
| 2008/0114230 A1 | 5/2008 | Addis |
| 2008/0140141 A1 | 6/2008 | Ben-David et al. |
| 2008/0140162 A1 | 6/2008 | Goetz et al. |
| 2008/0140167 A1 | 6/2008 | Hagen et al. |
| 2008/0147168 A1 | 6/2008 | Ransbury et al. |
| 2008/0167702 A1 | 7/2008 | Ransbury et al. |
| 2008/0177343 A1 | 7/2008 | Dal Molin et al. |
| 2008/0200802 A1 | 8/2008 | Bhavaraju et al. |
| 2008/0234588 A1 | 9/2008 | Feldman et al. |
| 2008/0255647 A1 | 10/2008 | Jensen et al. |
| 2008/0284599 A1 * | 11/2008 | Zdeblick et al. ........... 340/572.1 |
| 2008/0294062 A1 | 11/2008 | Rapoport et al. |
| 2008/0294218 A1 | 11/2008 | Savage et al. |
| 2008/0306394 A1 | 12/2008 | Zdeblick et al. |
| 2009/0024184 A1 | 1/2009 | Sun et al. |
| 2009/0054946 A1 | 2/2009 | Sommer et al. |
| 2009/0054947 A1 | 2/2009 | Bourn et al. |
| 2009/0088811 A1 | 4/2009 | Wulfman |
| 2009/0149902 A1 | 6/2009 | Kumar et al. |
| 2009/0299447 A1 | 12/2009 | Jensen et al. |
| 2010/0030294 A1 | 2/2010 | Wong et al. |
| 2010/0204766 A1 * | 8/2010 | Zdeblick et al. .............. 607/119 |
| 2011/0060392 A1 * | 3/2011 | Zdeblick et al. .............. 607/115 |

(56) References Cited

U.S. PATENT DOCUMENTS

| | | | |
|---|---|---|---|
| 2011/0096388 A1* | 4/2011 | Agrawal et al. | 359/268 |
| 2011/0208067 A1 | 8/2011 | Edman et al. | |
| 2011/0224578 A1 | 9/2011 | Edman et al. | |

FOREIGN PATENT DOCUMENTS

| | | |
|---|---|---|
| EP | 1050265 | 11/2000 |
| EP | 1136033 | 9/2001 |
| EP | 1266606 | 12/2002 |
| EP | 1426079 | 6/2004 |
| EP | 1938861 | 7/2008 |
| FR | 2097337 | 2/1972 |
| JP | 6456031 | 2/1988 |
| JP | 2-99036 | 4/1990 |
| JP | 3-055032 | 3/1991 |
| JP | 5169931 | 7/1993 |
| JP | 5269136 | 10/1993 |
| JP | 6501177 | 2/1994 |
| JP | 6-506619 | 4/1994 |
| JP | 7-542 | 1/1995 |
| JP | 08-031689 | 2/1996 |
| JP | H1056153 | 2/1998 |
| JP | 2000139833 | 5/2000 |
| JP | 2000350705 | 12/2000 |
| JP | 2002272758 | 9/2002 |
| JP | 2003525804 | 9/2003 |
| JP | 2003-347460 | 12/2003 |
| JP | 2006108531 | 4/2006 |
| JP | 2006140312 | 6/2006 |
| JP | 2007329189 | 12/2007 |
| WO | 9737720 | 10/1997 |
| WO | WO9912607 | 3/1999 |
| WO | WO9913561 | 3/1999 |
| WO | WO9913574 | 3/1999 |
| WO | WO9952588 | 10/1999 |
| WO | WO0009206 | 2/2000 |
| WO | WO0143821 | 6/2001 |
| WO | WO0166368 | 9/2001 |
| WO | WO0195787 | 12/2001 |
| WO | WO02053228 | 7/2002 |
| WO | WO02065894 | 8/2002 |
| WO | 02089655 | 11/2002 |
| WO | WO2004020040 | 3/2004 |
| WO | WO2004052182 | 6/2004 |
| WO | WO2004066814 | 8/2004 |
| WO | WO2004066817 | 8/2004 |
| WO | WO2004066825 | 8/2004 |
| WO | WO2004067081 | 8/2004 |
| WO | WO2005118064 | 12/2005 |
| WO | WO2006029090 | 3/2006 |
| WO | WO2006042039 | 4/2006 |
| WO | WO2006069322 | 6/2006 |
| WO | WO2006069323 | 6/2006 |
| WO | WO2006073915 | 7/2006 |
| WO | WO2006105474 | 10/2006 |
| WO | WO2007005641 | 1/2007 |
| WO | WO2007075974 | 7/2007 |
| WO | WO2007120884 | 10/2007 |
| WO | WO2007149546 | 12/2007 |
| WO | WO2008004010 | 1/2008 |
| WO | WO2008008755 | 1/2008 |
| WO | WO2008027639 | 3/2008 |

OTHER PUBLICATIONS

Borky et al., "Integrated Signal Conditioning for Silicon Pressure Sensors" IEEE Transactions on Electron Devices ED-26(12): 1906-1910 (1979).

Kovacs et al., "Technology Development for a Chronic Neutral Interface" A dissertation, Stanford University Aug. 1990 pp. 9, 225-234, 257, 276.

Little et al, "The Output of the Heart and its Control" Physiology of the Heart and Circulation, 4th ed. 1989 Year Book Medical Publishers Inc. pp. 165-187.

Meisel et al., "Transvenous Biventricular Defibrillation", The American Journal of Cardiology, vol. 86 (9A), Nov. (2000) pp. 76K-85K.

Paolocci et al., "Positive inotropic and lusitropic effects of HNO/NO in failing hearts: Independence from β-adrenergic signaling" PNAS vol. 100, No. 9 (2003) 5537-5542.

Receveur et al., "Latteraly Moving Bi-Stable MEMS DC-Switch for Biomedical Applications" Medtronic Bakken Research Center, The Netherlands (2004) pp. 854-856.

U.S. Appl. No. 11/917,992, filed Jul. 13, 2009 (Specification, Claims, Abstract and Figures as filed); Jensen et al., (2009) "Deployable Epicardial Electrode and Sensor Array" 69pp.

U.S. Appl. No. 12/097,959, filed Nov. 17, 2008 (Specification, Claims, Abstract and Figures as filed); Zdeblick et al., (2008) "Implantable Integrated Circuit" 199pp.

U.S. Appl. No. 12/395,538, filed Feb. 27, 2009 (Specification, Claims, Abstract and Figures as filed); Bi et al., (2009) "Integrated Circuit Implementation and Fault Control System, Device, and Method" 163pp.

* cited by examiner

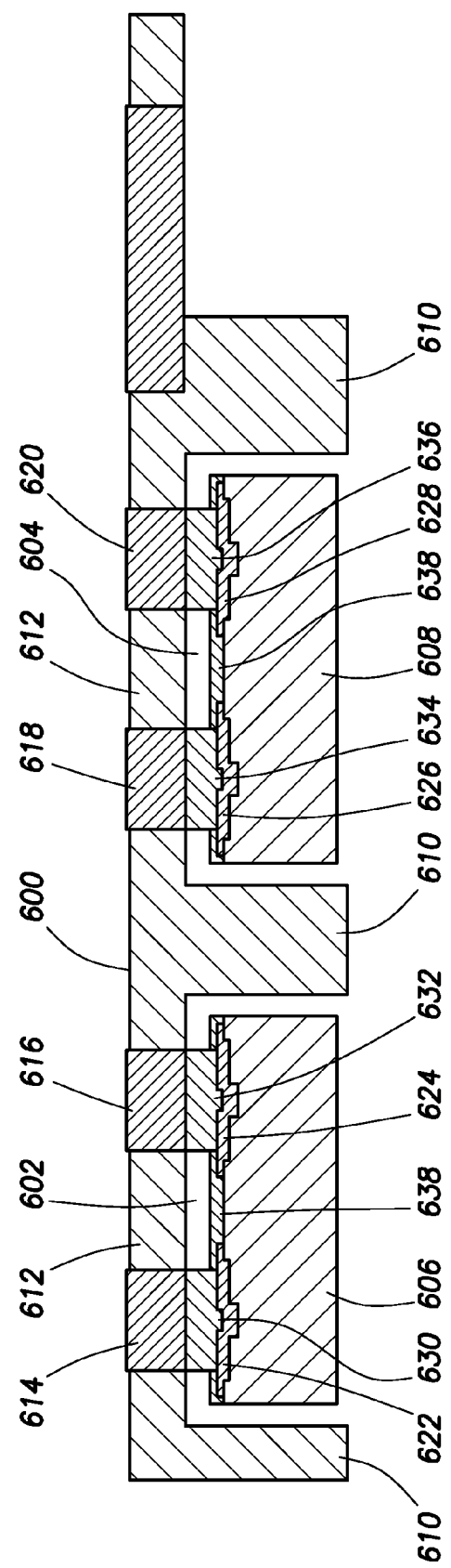

SOLID-STATE THIN-FILM CAPACITOR

CROSS-REFERENCE TO RELATED APPLICATIONS

Pursuant to 35 U.S.C. §119(e), this application claims priority to the filing date of U.S. Provisional Patent Application Ser. No. 61/228,027 (filed Jul. 23, 2009, titled "Solid-State Thin Film Capacitor"), the disclosure of which is herein incorporated by reference in its entirety.

FIELD OF THE INVENTION

The present invention relates to solid-state electronics. More particularly, the present invention relates to formation and use of capacitive structures on semiconductor substrates.

BACKGROUND OF THE INVENTION

Capacitors are passive electrical components that can store energy in an electric field between a pair of electrodes. Capacitors are often used in electronic circuits as energy-storage devices. A wide variety of different types of capacitors have been developed, including small electrolytic capacitors (for example as used in electronic circuits), basic parallel-plate capacitors, and mechanical variable capacitors. In general, for parallel plate capacitors, the capacitance depends on the dielectric constant of the dielectric material of the capacitor, the area of the electrodes, and the distance between the electrodes. Thin-film capacitors are used in electronic circuits and may have various structures, such as metal oxide semiconductor (MOS) type capacitors, PN junction type, polysilicon-insulator-polysilicon (PIP) type, metal-insulator-metal (MIM) type, and other suitable capacitive structures known in the art.

There is a continued desire in the field to produce increasingly complex implantable medical devices that have ever smaller dimensions, such that the capabilities of the device may be enhanced while the profile of the device may be reduced. To this end, a variety of different fabrication techniques have been employed to make implantable medical devices.

Published U.S. Patent application nos. 20060058588; 20050160827; 20050160826; 20050160825; 20050160824; 20050160823; 20040254483; 20040220637; 20040215049 and 20040193021 describe the use of planar processing techniques, such as Micro-Electro-Mechanical Systems (MEMS) fabrication, in the production of medical devices. Deposition techniques that may be employed in certain aspects of fabrication of the structures include, but are not limited to: electroplating, plasma spray, sputtering, e-beam evaporation, physical vapor deposition, chemical vapor deposition, plasma enhanced chemical vapor deposition, etc. Material removal techniques include, but are not limited to: reactive ion etching, anisotropic chemical etching, isotropic chemical etching, planarization, e.g., via chemical mechanical polishing, laser ablation, electronic discharge machining (EDM), etc. Also of interest are lithographic protocols.

One known type of material deposition protocol is cathodic arc deposition. In cathodic arc plasma deposition, a form of ion beam deposition, an electrical arc is generated between a cathode and an anode that causes ions from the cathode to be liberated from the cathode and thereby produce an ion beam. The resultant ion beam, i.e., plasma of cathodic material ions, is then contacted with a surface of a substrate (i.e., material on which the structure is to be produced) to deposit a structure on the substrate surface that is made up of the cathodic material, and in certain embodiments element(s) obtained from the atmosphere in which the substrate is present. A number of patents and published applications are available which describe various cathodic arc deposition protocols and systems. Such publications include U.S. Pat. Nos. 6,929,727; 6,821,399; 6,770,178; 6,702,931; 6,663,755; 6,645,354; 6,608,432; 6,602,390; 6,548,817; 6,465,793; 6,465,780; 6,436,254; 6,409,898; 6,331,332; 6,319,369; 6,261,421 ; 6,224,726; 6,036,828; 6,031,239; 6,027,619; 6,026,763; 6,009,829; 5,972,185; 5,932,078; 5,902,462; 5,895,559; 5,518,597; 5,468,363; 5,401,543; 5,317,235; 5,282,944; 5,279,723; 5,269,896; 5,126,030; 4,936,960; and Published U.S. Application Nos.: 20050249983; 20050189218; 20050181238; 20040168637; 20040103845; 20040055538; 20040026242; 20030209424; 20020144893; 20020140334 and 20020139662.

While cathodic arc deposition protocols are known, to the knowledge of the inventors of the present application such protocols have, to date, been used solely in non-medical device applications, such as the production of coatings on large industrial elements, such as rotor blades, etc., as well as in the production of jewelry.

Despite the significant progress that has been made by applying planar processing protocols, such as MEMS protocols, in medical device design and fabrication, there continues to be a need for the development of new fabrication techniques that can be employed to fabricate implantable medical devices that have ever increasing complexity and ever decreasing size specifications. Of particular interest would be the identification of a protocol that could be employed to produce compositions of deposited materials in a desired form, e.g., thick, stress-free layers, porous layers, and layers having crenulations, in a variety of different configurations, including complex three-dimensional configurations.

Yet, prior art techniques applied to form a capacitor on a semiconductor substrate require that the substrate area devoted to the capacitor is not optimally available to support the formation of other electrical elements. There is therefore a long-felt need to provide improved techniques of forming capacitive elements on a semiconductor substrate.

SUMMARY

To achieve this object and other objects that will be made obvious in light of the present invention, provided are solid-state thin-film capacitors. Aspects of the solid-state thin-film capacitors include a multilayer structure made up of a first electrode layer of a transition metal, a dielectric layer of an oxide of the transition metal, and a second electrode layer of a metal oxide. Also provided are methods of making the solid-state thin-film capacitors, as well as devices that include the same. The present invention further enables the production of capacitive structures formed of thick, stress-free metallic structures on a semiconductor substrate, even within substrate locations having high aspect ratios. Furthermore, alternative embodiments of the present invention allow for the production of porous metallic structures and metallic layers displaying crenulations on a surface thereof. As such, the present invention allows for the production of semiconductor device designs that have not before been possible, thereby providing for significant improvements in electronic device functionality while decreasing the overall size of the device.

Alternate aspects of the invention further include capacitors that have one or more cathodic arc produced structures, i.e., structures produced using a cathodic arc deposition process. The structures may be thick, stress-free metallic structures, porous layers and layers displaying crenulations. Embodiments of the invention further include methods of producing capacitors using cathodic arc deposition processes, as well as by chemical vapor deposition and/or by sputter deposition.

Incorporation by Reference

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include PCT Application Serial No. PCT/US2007/014505 titled "Metal Binary and Ternary Compounds Produced by Cathodic Arc Deposition," filed on Jun. 21, 2007; PCT Application Serial No. PCT/US2007/014509 titled "Implantable Medical Devices Comprising Cathodic Arc Produced Structures" filed on Jun. 21, 2007; U.S. Provisional Application Ser. No. 60/805,464 titled "Implantable Medical Devices Comprising Cathodic Arc Produced Structures" and filed on Jun. 21 , 2006; U.S. Provisional Application Ser. No. 60/805,578 titled "Cathodic Arc Deposition Hermetically Sealed Implantable Structures" and filed on Jun. 22, 2006; U.S. Provisional Application Ser. No. 60/805, 576 titled "Implantable Medical Devices Comprising Cathodic Arc Produced Structures" and filed on Jun. 22, 2006; U.S. Provisional Application Ser. No. 60/805,581 titled "Noble Metal Compounds Produced by Cathodic Arc Deposition" and filed on Jun. 22, 2006; U.S. Provisional Application Ser. No. 60/862,928 titled "Medical Devices Comprising Cathodic Arc Produced Microstrip Antennas" and filed on Oct. 25, 2006; U.S. Provisional Application Ser. No. 60/888, 908 titled "Metal Binary And Ternary Compounds Produced by Cathodic Arc Deposition" and filed on Feb. 8, 2007; U.S. Provisional Application Ser. No. 60/890,306 titled "Metal Binary And Ternary Compounds Produced by Cathodic Arc Deposition" and filed on Feb. 16, 2007; and U.S. Provisional Application Ser. No. 60/917,297 titled "Metal Binary And Ternary Compounds Produced by Cathodic Arc Deposition" and filed on May 10, 2007.

Such incorporated publications further include U.S. Pat. Nos. 6,929,727; 6,821,399; 6,770,178; 6,702,931; 6,663,755; 6,645,354; 6,608,432; 6,602,390; 6,548,817; 6,465,793; 6,465,780; 6,436,254; 6,409,898; 6,331,332; 6,319,369; 6,261,421 ; 6,224,726; 6,036,828; 6,031,239; 6,027,619; 6,026,763; 6,009,829; 5,972,185; 5,932,078; 5,902,462; 5,895,559; 5,518,597; 5,468,363; 5,401,543; 5,317,235; 5,282,944; 5,279,723; 5,269,896; 5,126,030; 4,936,960; and Published U.S. Application Nos.: 20050249983; 20050189218; 20050181238; 20040168637; 20040103845; 20040055538; 20040026242; 20030209424; 20020144893; 20020140334 and 20020139662.

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

FIGS. 6A and 6B show different cross-sectional views of assemblies with multiple hermetically sealed integrated circuits according to alternative embodiments of the invention, where cathodic arc produced conductive feed-throughs are present.

DETAILED DESCRIPTION

Figure 1:
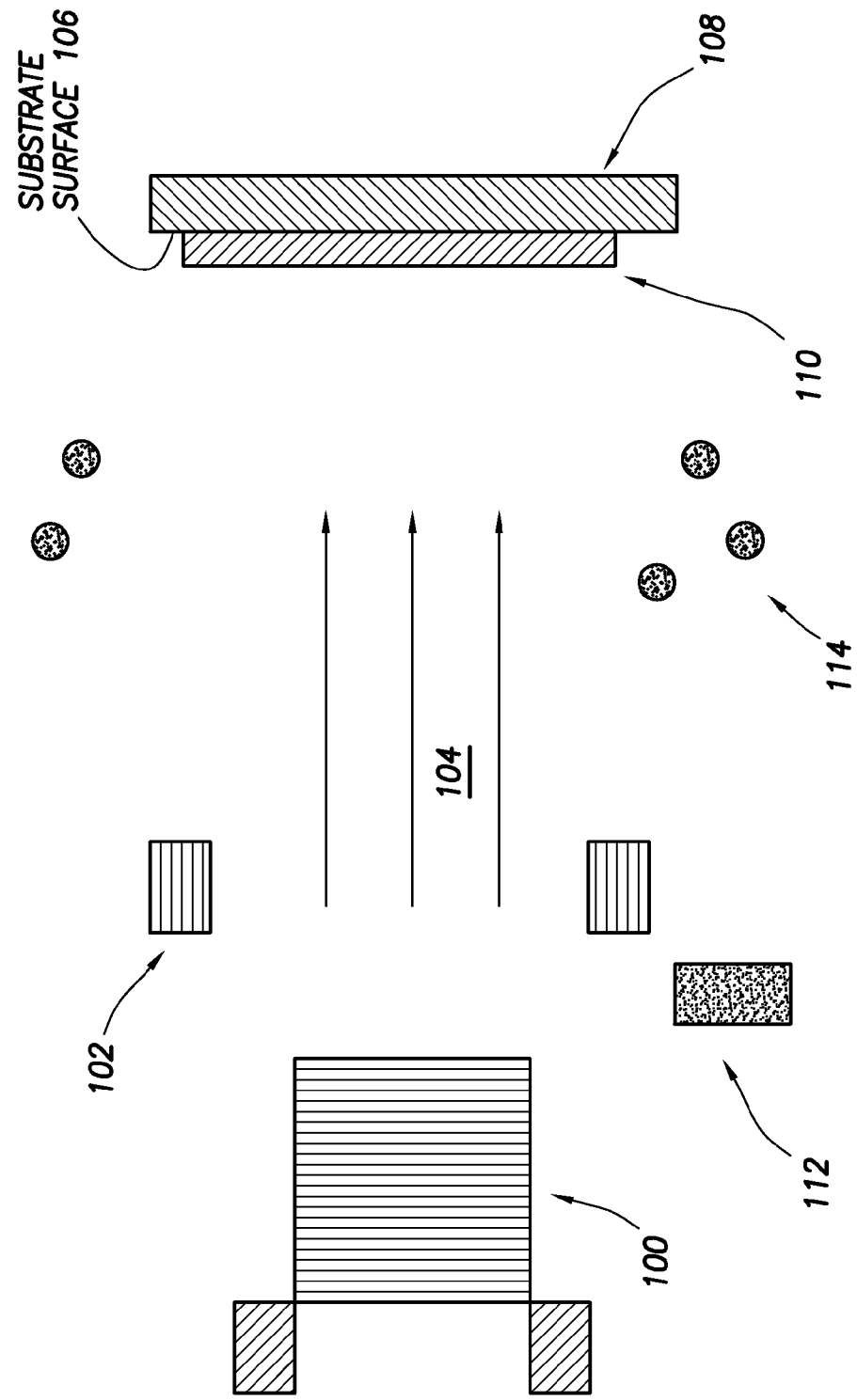
FIG. 1 provides a schematic depiction of a cathodic arc plasma source according to an embodiment of the invention.

Provided are solid-state thin-film capacitors. Aspects of the solid- state thin-film capacitors include a multilayer structure made up of a first electrode layer of a transition metal, a dielectric layer of an oxide of the transition metal, and a second electrode layer of a metal oxide. Also provided are methods of making the solid-state thin-film capacitors, as well as devices that include the same. As used herein, the term "solid-state" refers to a device or circuit that uses semiconductors rather than mechanical or vacuum tube circuits. Accordingly, the solid-state capacitors may have no moving parts, such that they have no mechanical action. In some instances, the solid-state capacitors are configured such that a current flowing through the capacitor flows from one electrode to the other electrode of the capacitor without flowing through a vacuum or a vacuum tube.

In further describing various aspects of the invention, designs and methods of manufacture and use of structures of semiconductor circuits and devices comprising semiconductor circuits are presented. A discussion of various applications in which the solid-state thin-film capacitors of the invention find use is provided. Solid-state thin-film capacitors are then further reviewed in greater detail. Methods of making the solid-state thin-film capacitors are reviewed.

The method of the present invention provides the semiconductor device designer and manufacturer with an important new tool for producing capacitive circuit elements. Using the protocols and systems of the invention, the semiconductor device manufacturer can produce thin film capacitors that heretofore could not be made proximate to other circuit elements. In further describing the invention in greater detail, embodiments of semiconductor devices that include cathodic arc produced structures are reviewed first, followed by a review of cathodic arc deposition methods for fabricating the structures and systems configured for use in practicing the methods.

Implantable Medical Devices having Cathodic Arc Produced Structures

As summarized above, the invention provides semiconductor devices, such as implantable medical devices, that include a cathodic arc produced capacitive structure(s). By implantable medical device is meant a device that is configured to be positioned on or in a living body, where in certain embodiments the implantable medical device is configured to be implanted in a living body. Certain aspects of the implantable devices are configured to maintain functionality when present in a physiological environment, including a high salt, high humidity environment found inside of a body, for 2 or more days, such as about 1 week or longer, about 4 weeks or longer, about 6 months or longer, about 1 year or longer, e.g., about 5 years or longer. In certain embodiments, the implantable devices are configured to maintain functionality when implanted at a physiological site for a period ranging from about 1 to about 80 years or longer, such as from about 5 to about 70 years or longer, and including for a period ranging from about 10 to about 50 years or longer. The dimensions of the implantable medical devices of the invention may vary. However, because the implantable medical devices are implantable, the dimensions of certain aspects of the devices are not so big such that the device cannot be positioned in an adult human. For example, the implantable medical devices may be dimensioned to fit within the vasculature of a human.

The function of the implantable medical devices of the invention may vary widely, including but not limited to: cardiac devices, drug delivery devices, analyte detection devices, nerve stimulation devices, etc. As such, implantable medical devices include, but are not limited to: implantable cardiac pacemakers, implantable cardioverter-defibrillators, pacemaker-cardioverter-defibrillators, drug delivery pumps, cardiomyostimulators, cardiac and other physiologic monitors, nerve and muscle stimulators, deep brain stimulators, cochlear implants, artificial hearts, etc. Illustrative embodiments of various types of implantable medical devices of the invention are reviewed in greater detail below.

As summarized above, implantable medical devices of the invention include one or more structures that are produced by a cathodic arc plasma deposition process. An example of a cathodic arc plasma deposition system is shown in FIG. 1. In cathodic arc plasma deposition, a form of ion beam deposition, an electrical arc is generated between a cathode 100 and an anode 102 that causes ions from the cathode 100 to be liberated from the cathode and thereby produce an ion beam 104, or plasma beam 104. The resultant ion beam 104, i.e., plasma of cathodic material ions, is then contacted with a surface of a substrate 108 (i.e., material on which the structure is to be produced) to deposit a structure 110 on a planar substrate surface 106 that is made up of the cathodic material, and in certain aspects element(s) obtained from the atmosphere in which the substrate 108 is present. See e.g., FIG. 1. Where desired, e.g., where the, product structure is a compound of the cathode material and one or more additional elements (such as carbon, nitrogen, etc.) a gas inlet 112 may be provided for introduction of a source gas for the one or more additional elements of interest. Also shown in FIG. 1 are neutral macroparticles 114, which particles may or may not be filtered from the plasma prior to deposition, as desired.

The cathodic arc produced structures of the invention are, in certain aspects, thick, stress-free metallic structures. In certain aspects, the structures range in thickness from about 0.01 µm to about 500 µm, such as from about 0.1 µm to about 150 µm. In certain aspects, the structures have a thickness of about 1 µm or greater, such as a thickness of about 25 µm or greater, including a thickness of about 50 µm or greater, where the thickness may be as great at about 75, 85, 95 or 100 µm or greater. In certain aspects, the thickness of the structures ranges from about 1 to about 200, such as from about 10 to about 100 µm.

Figure 2:
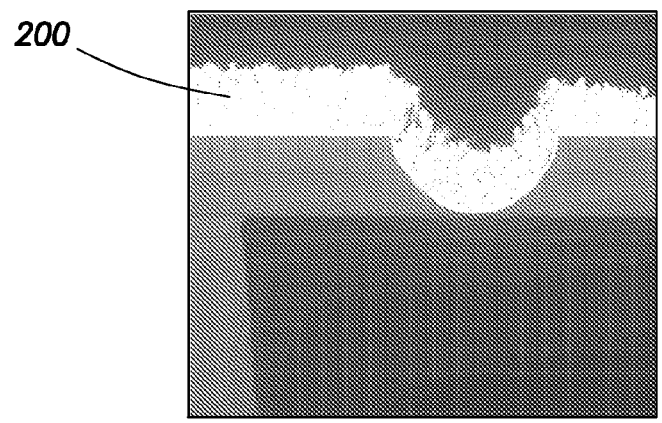
FIG. 2 provides pictures of a platinum layer deposited by cathodic arc deposition according to an embodiment of the invention.

The cathodic arc produced structures are, in certain aspects, stress free. By "stress-free" is meant that the structures are free of defects that would impair the functionality of the, structure. As such, "stress-free" means low stress as compared to stress that would cause the structures to pull away, e.g., delaminate, from the substrate 108 on which they are deposited. Accordingly, the structures are free of cracks, gaps, holes, or other defects, particularly those which would impair the function of the structure, e.g., the ability of the structure to seal an internal volume of the device, serves as a conductive element, etc. FIGS. 2 provides a view of stress-free layers of platinum produced according to another aspect of the invention.

Figure 3:
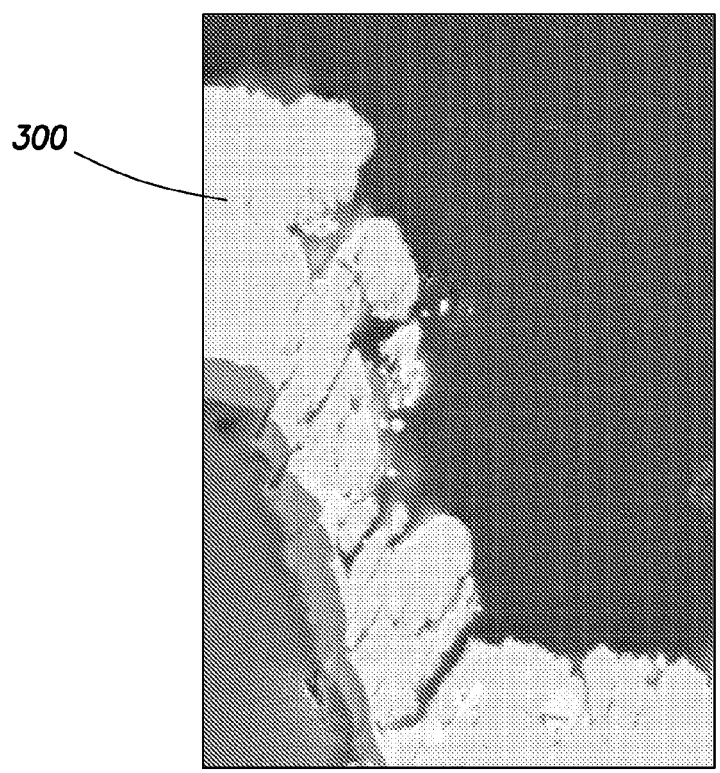
FIG. 3 provides a picture of a platinum layer deposited by cathodic arc deposition according to an embodiment of the invention, where the layer displays surface crenulations.

In yet other aspects, the structure is a layer that exhibits surface crenulations. By surface crenulations is meant a series of projections separated by notches or crevices. The depth of a given notch as measured from the top of a given projection ranges, in certain aspects, from about 0.1 µm to about 1000 µm, such as from about 1 µm to about 10 µm. FIG. 3 provides views of 10 µm thick layers of platinum exhibiting surface crenulations produced according to another aspect of the invention. In yet other aspects, the cathodic arc structures are porous structures.

As indicated above, the structures are, in certain aspects, metallic structures. In certain aspects, the metallic structures are structures that include a physiologically compatible metal, where physiologically compatible metals of interest include, but are not limited to: gold (au), silver (ag), nickel (ni), osmium (as), palladium (pd), platinum (pt), rhodium (rh), iridium (ir) titanium (ti), aluminum (al), vanadium (v), zirconium (zr), molybdenum (mo), iridium (ir), thallium (tl), tantalum (ta), and the like. In certain aspects, the metallic structure is a pure metallic structure of a single metal. In yet other aspects, the metallic structure may be an alloy of a metal and one or more additional elements, e.g., with the metals listed above or other metals, e.g., chromium (cr), tungsten (w), etc. In yet other aspects, the structure may be a compound of a metal and additional elements, where compounds of interest include but are not limited to: carbides, oxides, nitrides, etc. Examples of compounds of interest include binary compounds, e.g., PtIr, PtTi, TiW and the like, as well as ternary compounds, e.g., carbonitrides, etc.

In certain aspects, non-metallic structures are desired. For example, in certain aspects the layer is carbon, such as diamond-like carbon. In these applications of the method of the present invention, the cathode material employed in the methods may be graphite. In certain aspects, the diamond like carbon layer may be doped with one or more additional elements, e.g., nitrogen, gold, platinum, etc. Applications for such structures are varied, such as coatings for medical implants, etc.

In certain aspects, the produced structure may include a gradient with respect to one element and the other, e.g., such as a metallic layer that has increasing amounts of a second element going from a first surface to a second surface. Additional materials that may make up a cathodic arc produced structure are described in copending PCT Application Serial No. PCT/US2007/014505 titled "Metal Binary and Ternary Compounds Produced by Cathodic Arc Deposition," (having attorney docket no. PRTS-048W02) and filed on Jun. 21, 2007, the disclosure of which is herein incorporated by reference.

The substrate 108 on which the metallic structures are cathodic arc deposited may be made up of a variety of different materials and have a variety of different configurations. The surface of the substrate 108 on which deposition occurs may be planar or non-planer, e.g., have a variety of holes, trenches, etc. The substrate 108 may be made up of any of a number of different materials, such as silicon, (e.g., single crystal, polycrystalline, amorphous, etc), silicon dioxide (glass), ceramics, silicon carbide, alumina, aluminum oxide, aluminum nitride, boron nitride, beryllium oxide, among others; diamond-like carbon, sintered materials, etc. The substrate 108 may be a composite of a conductive and semi-conductive materials (such as Ge), including highly doped and/or heated semi-conductor silicon, e.g., a circuit layer, such as those described below, where one or more conductive elements are present on a semi or non-conductive support.

The cathodic arc produced structures of the subject implantable medical devices may have a variety of different configurations and serve a variety of different functions in the implantable medical device in which they are found. For example, in certain applications of the method of the present invention the cathodic arc produced structures are layers that cover a least a portion of a surface of a component of the implantable medical device. In these aspects, the layers may cover only a fraction of the surface or they may cover all of the surface, depending on the function of the layer. The layers may have a number of different purposes. In other applications of the method of the present invention, the cathodic arc produced structures are non-layer structures, e.g., feed-throughs, identifiers, antennas, etc., which non-layer structures may also have a number of different functions. Representative layer and non-layer structures are now reviewed in greater detail.

Structures having a Layer Configuration

As summarized immediately above, in certain applications of the method of the present invention the cathodic arc produced structures are layer structures, by which is meant that they have a layer configuration, thereby having a length and width that is significantly greater than their height, e.g., by at 5- fold or more, such as by 50- fold or more and including by 100- fold or more. Depending on the purpose of the layer structure, the layer can have a variety of different configurations.

Sealing Layers

In certain aspects, one or more layer structures serve to seal an internal volume of the device from the external environment of the device, where such a sealing layer may be present on a single surface of the device or on more than one surface of the device, e.g., where the sealing layer may be present on every surface of the device. In certain aspects, the cathodic arc deposited structures are the sealing layers described in PCT/US2005/046815 titled "Implantable Hermetically Sealed Structures" and published as WO 2006/069323; and PCT/US2007/09270 titled "Void-Free Implantable Hermetically Sealed Structures," filed on Apr. 12, 2007; the disclosures of which are herein incorporated by reference. The layers may encapsulate the entire device, e.g., to provide a sealing layer that encloses the entire device, i.e., all surfaces of the device, or just a portion thereof, such as is described in PCT application serial no. PCT/US2007/09270 titled "Void-Free Implantable Hermetically Sealed Structures," filed on Apr. 12, 2007; the disclosure of which is herein incorporated by reference.

Figure 4A:
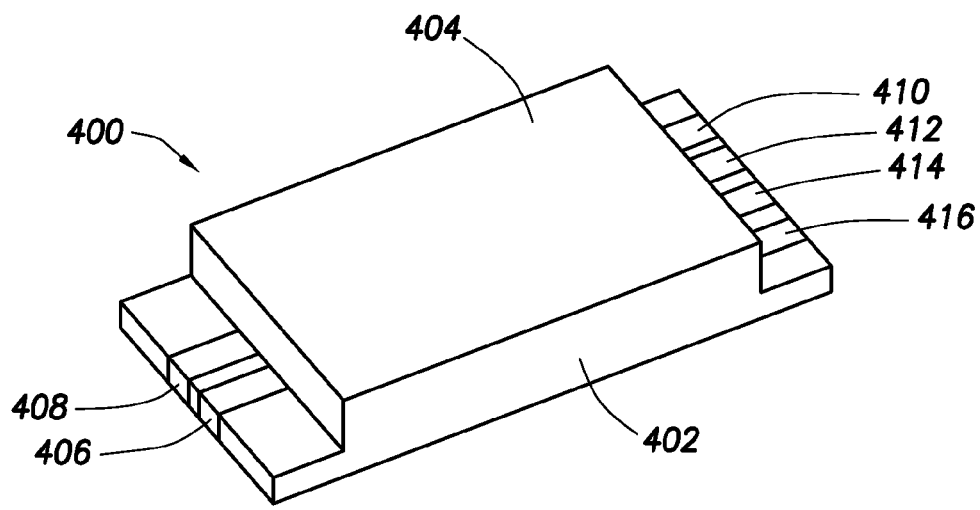
FIGS. 4A and 4B show different three-dimensional views of a hermetically sealed integrated circuit according to an embodiment of the invention.
Figure 4B:
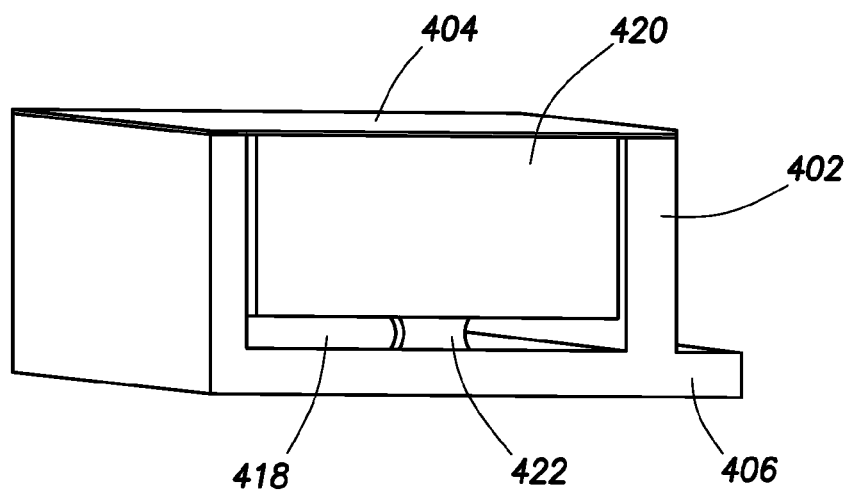

An example of an implantable medical device that includes a cathodic arc produced layer is provided in FIGS. 4A and 4B. FIG. 4A provides a three-dimensional view of a hermetically sealed structure according to a aspect of the invention. In FIG. 4A, structure 400 includes holder 402 and sealing layer 404, where the sealing layer 404 has been deposited via cathodic arc deposition. Sealing layer 404 and holder 402 are configured to define a hermetically sealed volume (not shown) inside the holder. Also shown are external connector elements 406, 408, 410, 412, 414 and 416, which are coupled to conductive feed-throughs (not shown) present in the bottom of the holder.

FIG. 4B provides a three-dimensional cut-away view of a hermetically sealed structure according to a aspect of the invention. In FIG. 4B, holder 402 and sealing layer 404 define a hermetically sealed volume 418 what holds an effector (e.g., comprising an integrated circuit) 420. The effector 420 is electrically coupled to the conductive (e.g., platinum) feed-throughs or vias 406 with a solder alloy (e.g., lead tin, gold tin, silver tin, or other suitable alloys) 422.

In certain aspects, any space between an effector and the walls of the holder and/or sealing layer may be occupied by an insulating material. Any convenient insulating material may be employed, where representative insulating materials include, but are not limited to: liquids, e.g., silicon oil, elastomers, thermoset resins, thermoset plastics, epoxies, silicones, liquid crystal polymers, polyamides, polyimides, benzo-cyclo-butene, ceramic pastes, etc.

Additional examples of sealing layers that may be produced according to aspects of the invention are provided in published PCT Application No. WO 2006/069323, and pending PCT Application No. PCT/US2007/09270 titled "Void-Free Implantable Hermetically Sealed Structures," filed on Apr. 12, 2007; the disclosures of which are herein incorporated by reference.

FIG. 2 is an image of a platinum layer 200 deposited by cathodic arc deposition according to an embodiment of the invention, and FIG. 3 provides a picture of the platinum layer 200 deposited by cathodic arc deposition according to an embodiment of the invention, where the layer displays surface crenulations 300.

Crenulated Layers

As summarized above, the cathodic arc deposited structures may be crenulated layers, in that they exhibit a crenulated surface 300, such as seen in FIG. 3. Such layers find use in a variety of different applications.

For example, providing a crenulated surface on an implant finds use in applications were osseointegration is desired. The crenulated layer can be produced in both deposited metals (e.g., Pt) and metallic compounds (e.g., TiO2). The crenulated layers can be deposited on a variety of bone implant devices, where the implant devices may be metal implants, or polymeric, e.g., PEEK and PEKK, implants. Bone implant devices of interest include, but are not limited to: hip implants, bone screws, dental implants, plates, support rods, etc.

Where desired, the crenulations can be filled with active agents, e.g., to aid bone growth and retard bacterial growth. Active agents of interest include, but are not limited to: organic polymers. e.g., proteins, including bone associated proteins which impart a number of properties, such as enhancing resorption, angiogenesis, cell entry and proliferation, mineralization, bone formation, growth of osteoclasts and/or osteoblasts, and the like, where specific proteins of interest include osteonectin, bone sialoproteins (Bsp), α-2HS-glycoproteins, bone Gla-protein (Bgp), matrix Gla-protein, bone phosphoglycoprotein, bone phosphoprotein, bone proteoglycan, protolipids, bone morphogenic protein, cartilage induction factor, platelet derived growth factor, skeletal growth factor, and the like; particulate extenders; inorganic water soluble salts, e.g., NaCl, calcium sulfate; sugars, e.g., sucrose, fructose and glucose; pharmaceutically active agents, e.g. antibiotics (such as gentamycin); and the like.

Crenulated layers 300 are also of interest as active agent depots on devices other than bone implant devices. For example, active agent coated stents are of interest in certain medical applications. Such devices may include a crenulated layer of the invention in which the notches or crevices of the layer serve as depots or reservoirs for an active agent of interest, where the crenulations can be filled by saturating the surface with a drug in solution, e.g., under pressure. Active agents of interest include, but are not limited to: (a) anti-thrombotic agents such as heparin, heparin derivatives, urokinase, and PPack (dextrophenylalanine proline arginine chloromethylketone); (b) anti-inflammatory agents such as dexamethasone, prednisolone, corticosterone, budesonide, estrogen, sulfasalazine and mesalamine; (c) anti-neoplastic/antiproliferative/anti-miotic agents such as paclitaxel, 5-fluorouracil, cisplatin, vinblastine, vincristine, epothilones, endostatin, angiostatin, angiopeptin, monoclonal antibodies capable of blocking smooth muscle cell proliferation, and thymidine kinase inhibitors; (d) anesthetic agents such as lidocaine, bupivacaine and ropivacaine; (e) anticoagulants such as D-Phe-Pro-Arg chloromethyl ketone, an RGD peptide containing compound, heparin, hirudin, antithrombin compounds, platelet receptor antagonists, anti-thrombin antibodies, anti-platelet receptor antibodies, aspirin, prostaglandin inhibitors, platelet inhibitors and tick antiplatelet peptides; (f) vascular cell growth promoters such as growth factors, transcriptional activators, and translational promotors; (g) vascular cell growth inhibitors such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin; (h) protein kinase and tyrosine kinase inhibitors (e.g., tyrphostins, genistein, quinoxalines); (i) prostacyclin analogs; (j) cholesterol lowering agents; (k) angiopoietins; (l) antimicrobial agents such as triclosan, cephalosporins, aminoglycosides and nitrofurantoin; (m) cytotoxic agents, cytostatic agents and cell proliferation affectors; (n) vasodilating agents; (o) agents that interfere with endogenous vasoactive mechanisms; (p) inhibitors of leukocyte recruitment, such as monoclonal antibodies; (q) cytokines, and (r) hormones. Of interest in certain aspects are anti-inflammatory agents, e.g., glucocorticosteroids, such as dexamethasone, etc.

Porous Layers

Also of interest are porous cathodic arc deposited layers. Porous cathodic arc deposited layers find use in a variety of different medical device components; such as but not limited to: electrodes, implant coatings, etc. One type of component of interest in which cathodic arc produced porous layers find use is high surface area electrode components, where such components find use in a variety of different implantable devices, e.g., as effectors (such as sensors or stimulators), as components of power sources, etc.

Aspects of the inventive batteries of the present invention include structures having a high surface area cathode. By high surface area cathode is meant a cathode having a surface area that is about 2 fold or greater, such at about 10 fold or greater, than the area of the surface of a solid support that is covered by the cathode in the battery. In certain aspects, the active area of the electrode has a surface area that is $10^3$ or more, such as $10^7$ or more and include $10^9$ or more, greater than the corresponding surface area resulting from the basic geometrical shape of the electrode. In certain aspects, the surface area of the cathode ranges from about 0.01 $mm^2$ to about 100 $mm^2$, such as from about 0.1 $mm^2$ to about 50 $mm^2$ and including from about 1 $mm^2$ to about 10 $mm^2$. In certain aspects, the high surface area cathode is obtained by having a cathode that is made up of an active cathode material present on a porous under-layer. In addition, the batteries include an anode present on a surface of a solid support.

Figure 5:
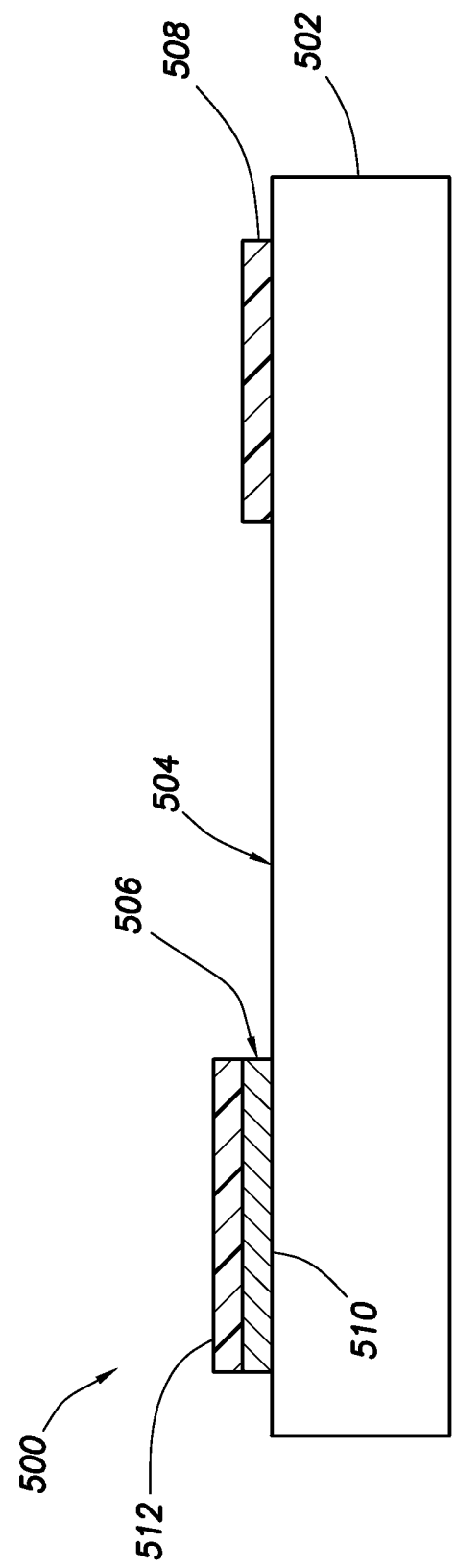
FIG. 5 shows one embodiment of a battery having a porous cathode under-layer according to one embodiment of the invention.

Depending on the particular aspect, the cathode and anode maybe present on the same support or different supports, e.g., where two or more different supports are bonded together to produce the battery structure, e.g., as is present in a "flip-chip" aspect. Similarly, the number of cathodes and anodes in a given battery may vary greatly depending on the aspect, e.g., where a given aspect may include a single battery having one anode and cathode, a single battery having multiple anodes and/or cathodes, or two or more distinct batteries each made up of one or more cathodes and/or anodes. Battery configurations of interest include, but are not limited to, those disclosed in Application Ser. No. 60/889,870 titled "Pharma Informatics System Power Source Having High Surface Area Cathodes" and filed on Feb. 14, 2007; the disclosure of which is herein incorporated by reference. FIG. 5 provides a schematic illustration of battery according to a aspect of the invention. The battery 500 shown in FIG. 5 includes a solid support 502 having an upper surface 504. Present on the upper surface 504 is cathode 506 and anode 508. Cathode 506 includes porous under-layer 510 and active cathode material 512. Each of these elements is now described in greater detail below. While the aspect depicted is where the cathode includes a porous under-layer, in certain aspects it is the anode that includes a porous underlayer, while in yet other aspects both a cathode and anode have the porous under-layer.

The porous under-layer 510 is a layer that mechanically supports the active cathode material 512 and provides for current passage between the cathode material and elements, e.g., circuitry, present on the solid support 502 (described in greater detail below). The porous under-layer may be fabricated from a variety of different materials, such as conductive materials, e.g., copper, titanium, aluminum, graphite, etc., where the materials may be pure materials or materials made up of two or more elements, e.g., as found in alloys, etc. The thickness of the under-layer may vary, where in certain aspects the thickness ranges from about 0.01 μm to about 100 μm, such as from about 0.05 μm to about 50 μm and including from about 0.01 μm to about 10 μm. The dimensions of the porous under-layer with respect to length and width on the surface of the solid support mayor may not be coextensive with the same dimensions of the active cathode material, as desired.

As summarized above, the cathode under-layer may be rough or porous. The porosity or roughness of the under-layer may vary, so long as it imparts the desired surface area to the cathode. In certain aspects, the porosity or roughness of the cathode under-layer is chosen to provide an effective surface area enhancement of about 1.5 times or more to about 1000 times or more, e.g., from about 2 to about 100 times or more, such as from about 2 to about 10 times or more, greater than that obtained from a comparable cathode that lacks the porous under-layer. Surface area enhancement can be determined by comparing the electrochemical capacitance or cyclic voltammogram of the rough or porous electrode with that of a smooth electrode of the same material. Roughness may also be determined by other techniques, such as atomic force microscopy (AFM), electron microscopy, or Brunauer-Emmett-Teller (BET) analysis.

According to the invention, a cathodic arc deposition protocol is employed to produce the desired porous cathode under-layer. In such protocols, a cathodic arc generated metallic ion plasma is contacted with a surface of a substrate 108, e.g., 502, under conditions sufficient to produce the desired structure of the porous cathode under-layer, e.g., as described above. The cathodic arc generated ion plasma beam 104 of metallic ions may be generated using any convenient protocol. As detailed below, in generating an ion beam by cathodic arc protocols, an electrical arc of sufficient power is produced between a cathode and one or more anodes so that an ion beam of cathode material ions is produced. The resultant beam is directed to at least one surface of a substrate 108 in a manner such that the ions contact the substrate surface 106 and produce a structure on the substrate surface 106 that includes the cathode material.

Present on top of the porous cathode (or anode) under-layer is the active cathode (or anode) material. The active cathode material may comprise a variety of different materials. In certain aspects, the cathode material includes copper, where of particular interest in certain aspects are cuprous iodide (CuI) or cuprous chloride as the cathode material. Where desired, e.g., to enhance voltage of the battery, the active material may be doped with additional elements, e.g., sulfur, etc. The active cathode material may be provided onto the porous under-layer using any convenient protocol, including such as electrodeposition, e.g., electroplating, or evaporation, e.g., chemical vapor deposition. The anode material may comprise a variety of different materials. In certain aspects, the anode material includes magnesium (Mg) metal or magnesium alloy. The active anode material may be provided onto the porous under-layer using any convenient protocol, such as electrodeposition, e.g., electroplating, or evaporation, e.g., chemical vapor deposition.

Structures having a Non-Layer Configuration

In certain aspects, the cathodic arc deposited structure is a non-layer, three-dimensional component of the medical device, where such components may vary widely in terms of configuration and function. Three-dimensional components of interest that may be produced using the subject deposition protocols, described in greater detail below, include but are not limited to: conductive elements, e.g., vias or other conductive lines found in an implantable medical device; communication elements, e.g., antennae; identification components, e.g., identification markings on the device; orientation components, e.g., surface elements that are employed to orient the device under imaging; effectors, such as tissue interaction elements, e.g., electrodes, etc.

Vias and Analogous Structures

In certain aspects, the cathodic arc deposited structure is a three-dimensional conductive element of the device. In certain aspects, the conductive element serves to conductively connect two distinct structures of the device. In certain aspects, the conductive element is a via, where the via may be present in a high aspect ratio passage of the device. By high aspect ratio passage is meant a passage having a height to width ratio of up to about 100 or higher, such as from about 1 to about 50.

FIG. 6A provides a cross-sectional view of a hermetically sealed structure that includes cathodic arc produced conductive feed-throughs according to another aspect of the invention. In this aspect, the holder 600 includes two distinct wells 602 and 604, positioned side by side, e.g., in an array format, where each well houses two different effectors 606 and 608 (e.g., integrated circuits). Each well includes sides 610 and a bottom 612. Also shown in the bottom of each well are cathodic arc produced conductive feed-throughs 614, 616, 618, and 620. Electrically coupling the traces 622, 624, 626, and 628 of integrated circuits 606 and 608 to the conductive feed-throughs are solder connections 630, 632, 634, and 636. Separating the different solder connections from each other is insulating material 638. Although not shown, a suitable insulating material may also be present in the spaces between the effectors and the sides/bottom of the wells of the holder. In addition, a sealing layer is present on the surface opposite the feed-throughs, although not shown in FIG. 6A. While the depiction of FIG. 6A shows only two different integrated circuits hermetically sealed, structures of the invention may include many more integrated circuits, e.g., 4, 5, 6, or more circuits, in any convenient arrangement. One aspect of the multiple chips per package design is to have a chip that is fabricated or otherwise designed to withstand higher voltages in one section of the assembly. The companion chip has a lower voltage tolerance than the first chip, but would not need the capacity of sustaining high voltages from cardiac pacing or other component demands from another part of the assembly. Both of those chips are dropped into the same hermetic packaging, e.g., in the same well or side by side wells, attached with a soldering process and then secured in place with an insulating material (i.e., potted), planarized or lapped back, e.g., as reviewed below, and then covered with a sealing layer.

While the above example provides guidance on synergistically providing two chips within a single inventive corrosion resistant hermetic package, these assemblies can handle up to 4, 5, 6, or more chips in a single assembly. In such larger scale assemblies, there is also the advantage that these assemblies can be stacked on top of each other to add more functionality to the medical device components to be hermetically protected.

Figure 6B:
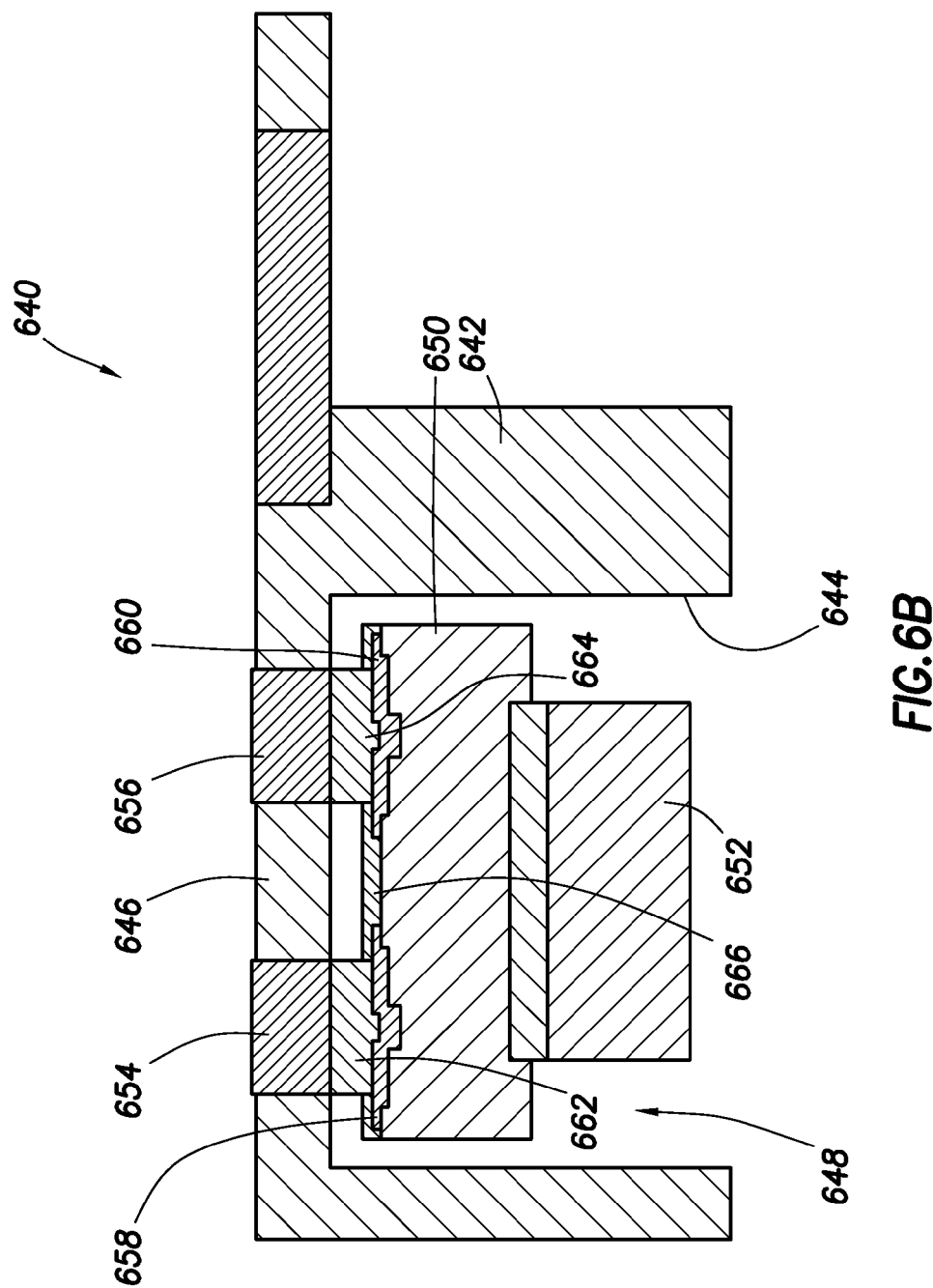

In FIG. 6B, structure 640 includes holder 642 with sides 644 and bottom 646 defining well 648. Present in well 648 are two different effectors 650 and 652 stacked on top of each other. Also shown in the bottom of each well are cathodic arc produced conductive feed-throughs 654 and 656. Electrically coupling the traces 658 and 660 of integrated circuit 650 to the conductive feed-throughs are solder connections 662 and 664. Separating the different solders from each other is insulating material 666. Although not shown, a suitable insulating material may also be present in the spaces between the effectors and the sides/bottom of the well of the holder. In addition, a sealing layer is present on the surface opposite the feed-throughs, although not shown in FIG. 6B.

Communication Elements

As reviewed above, cathodic arc produced structures of interest include antenna structures. Because of the nature of the cathodic arc deposition process, antenna structures that heretofore could not be realized are now readily producible. Antenna structures may be straight or non-straight, e.g., curved, and have two dimension or three-dimensional configurations, as desired.

Figure 7A:
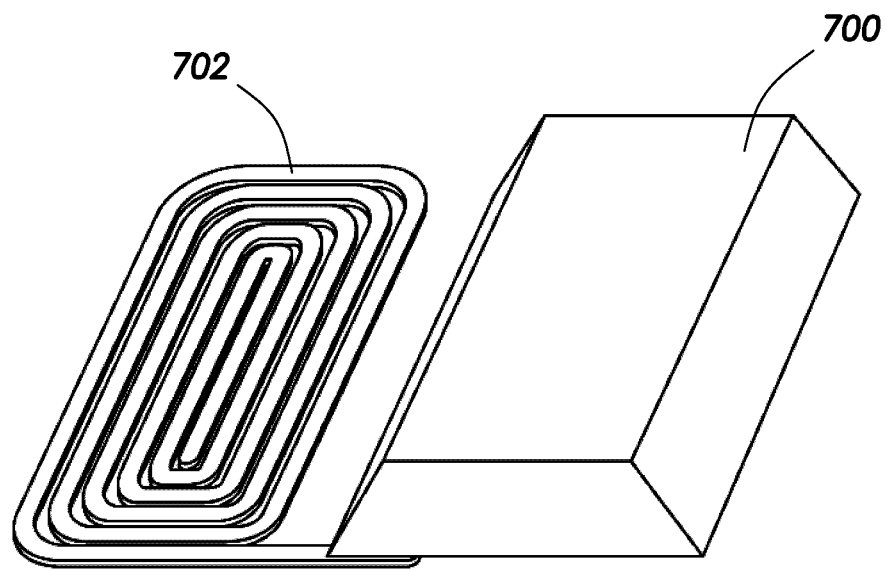
FIG. 7A shows a cross section of an IC chip where a cathodic arc produced thick metal structure forms an antenna to one side of the chip.
Figure 7B:
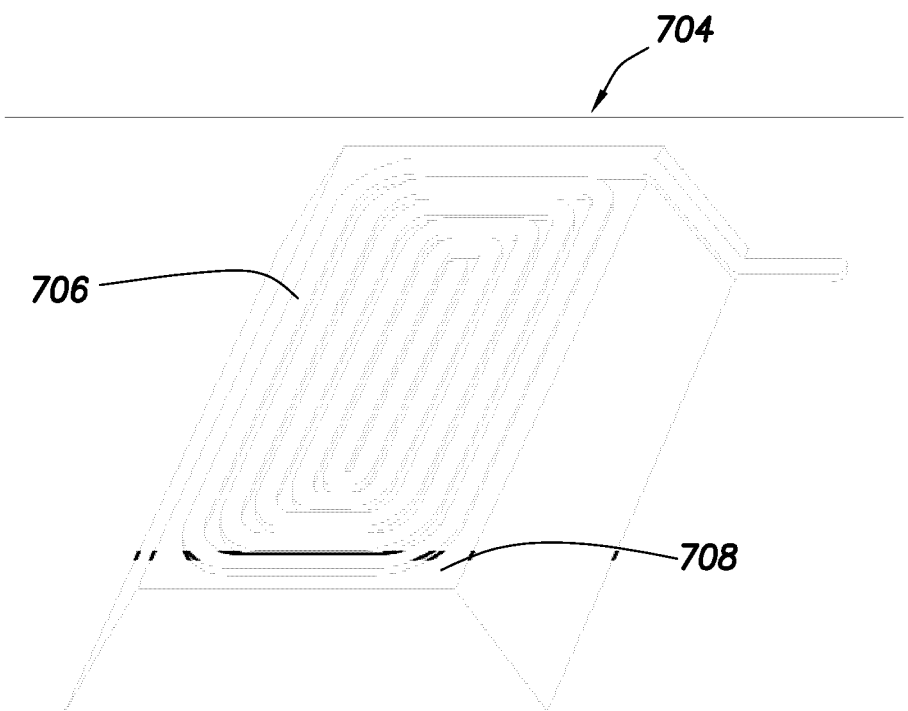
FIG. 7B shows a cross section of an IC chip where a thick metal forms an antenna on one side of the chip.

One aspect of a non-straight antenna that is readily produced via cathodic arc deposition protocols is shown in FIGS. 7A and 7B. FIG. 7A shows a cross section of an IC chip where a cathodic arc deposited thick metal structure forms an antenna to one side of the chip. The thick metal is free standing. The thick metal can also be supported by a substrate 108. FIG. 7B shows a cross section of an IC chip where a thick metal forms an antenna on one or more sides of the chip. The thick metal antenna depicted in these Figures is readily produced via cathodic arc using an appropriate mask and depositing the antenna structure on a support.

The substrate 108 on which the metallic structures are cathodic arc deposited may be made up of a variety of different materials and have a variety of different configurations. The surface of the substrate 108 on which deposition occurs may be planar or non-planer, e.g., have a variety of holes, trenches, etc. For example, holes in the substrate 108 may surface as feed-throughs following deposition of the patch layer, as described above, and further elaborated in pending U.S. Provisional Application Ser. No. 60/805,576 filed on Jun. 22, 2006, the disclosure of which is hereby incorporated by reference. The substrate 108 may be made up of any of a number of different materials, where dielectric materials are of interest, such as, but not limited to: silicon, (e.g., single crystal, polycrystalline, amorphous, etc), silicon dioxide (glass), ceramics, Teflon, etc.

In addition to the patch layer and the substrate 108, the subject microstrip antennas may also include a ground plane layer. The ground plane layer may be fabricated of any suitable conductive material and, in certain aspects, may be part of the device with which the antenna is operatively coupled, e.g., the conductive housing of an implantable medical device.

In certain aspects, the patch layer may also be covered with a protective layer, e.g., that is fabricated from a suitable dielectric material, which serves to protect the patch layer from body fluids. In certain aspects, this protective layer may be configured as a radome structure, e.g., as described in U.S. Pat. No. 5,861,019, the disclosure of which is herein incorporated by reference.

Methods

Also provided are methods of manufacturing implantable medical devices that include cathodic arc produced structures, where the methods include production of a structure using a cathodic arc deposition protocol.

The methods of the invention include contacting a cathodic arc generated metallic ion plasma with a surface of a substrate 108 under conditions sufficient to produce the desired structure of the implantable medical device, e.g., as described above. The cathodic arc generated ion plasma beam 104 of metallic ions may be generated using any convenient protocol. In generating an ion beam by cathodic arc protocols, an electrical arc of sufficient power is produced between a cathode and one or more anodes so that an ion beam of cathode material ions is produced. The resultant beam is directed to at least one surface of a substrate 108 in a manner such that the ions contact the substrate surface 106 and produce a structure on the substrate surface 106 that includes the cathode material. See e.g., FIG. 1. Any convenient protocol for producing a structure via cathodic arc deposition may be employed, where protocols known in the art which may be adapted for use in the present invention include, but are not limited to those described in U.S. Pat. Nos. 6,929,727; 6,821,399; 6,770,178; 6,702,931; 6,663,755; 6,645,354; 6,608,432; 6,602,390; 6,548,817; 6,465,793; 6,465,780; 6,436,254; 6;409,898; 6,331,332; 6,319;369; 6,261,421; 6,224,726; 6,036,828; 6,031,239; 6,027,619; 6,026,763; 6,009,829; 5,972,185; 5,932,078; 5,902,462; 5,895,559; 5,518,597; 5,468,363; 5,401,543; 5;317,235; 5,282,944; 5,279,723; 5,269,896; 5,126,030; 4,936,960; and Published U.S. Application Nos.: 20050249983; 20050189218; 20050181238; 20040168637; 20040103845; 20040055538; 20040026242; 20030209424; 20020144893; 20020140334 and 20020139662; the disclosures of which are herein incorporated by reference. In certain aspects, all of the surfaces of a substrate 108 may be contacted with the plasma, e.g., to encapsulate the substrate 108 in a layer of cathodic arc deposited material, e.g., as described in PCT Application Serial No. PCT12007/09270 filed on Apr. 12, 2007 titled "Void-Free Implantable Hermetically Sealed Structures"; the disclosure of which is herein incorporated by reference.

In certain aspects, the cathodic arc deposition protocol employed is one that produces a thick, stress-free metallic structure on a surface of a substrate 108, e.g., as described above. As such, the method is one that produces a defect free metallic layer on a surface of the substrate 108 that has a thickness of about 1 µm or greater, such as a thickness of about 25 µm or greater, including a thickness of about 50 µm or greater, where the thickness may be as great at about 75, 85, 95 or 100 µm or greater.

In accordance with the present invention, there is provided an improved methodology for depositing a layer of material on the substrate surface 106 by cathodic arc deposition on a substrate surface 106. In certain aspects, the substrate 108 is subjected to deformation or force to produce layers of significantly improved character, relative to corresponding layers produced by deposition on a substrate 108 not subjected to such deformation or force.

The method of stress engineering in accordance with the invention is also usefully employed in a wide variety of materials fabrication applications, such as for example, the formation on a silicon substrate 108 of a cathodic arc or sputtered metal film whose growth stress is large and compressive. Since the coefficient of thermal expansion of the metal film is greater than that of the Si substrate material, the stress in the film at room temperature can be reduced by depositing at an elevated temperature. At the elevated deposition temperature, the film is still in compression, but as it cools on the substrate 108, it approaches a stress-free state. However, such elevated temperature film-formation conditions may be detrimental to other layers of an integrated circuit (IC) device present on the substrate 108. The same near-stress-free state can be obtained in accordance with the present invention by constraining the substrate 108 during the sputter deposition, e.g., with a suitable constraining element, and then releasing the constraint after deposition, so that the top surface of the substrate 108 is given the amount of compressive strain as is needed to be released from the sputtered metal layer.

The methodology of the invention is also applicable in the converse to the production of layers that have little growth stress, but must be deposited at a high temperature because of the constraints of a deposition or other elevated temperature process. In such case, the thermal expansion mismatch strain can be compensated in the practice of the invention by heating the substrate 108 at the deposition temperature. In this way, there is little or no stress during deposition, and a stress is created during cooling, but the stress is then relieved by removing the wafer constraint.

In certain aspects, contact of the plasma and the substrate 108 surface in the subject methods occurs in a manner such that compressive and tensile forces experienced by deposited metal structure substantially cancel each other out so that the deposited metal structure is stress-free. In these aspects, various parameters of the deposition process, including distance between the substrate 108 and the cathode, temperature of the substrate 108 and the power employed to produce the plasma are selected so that the product metallic layer is stress-free. In these aspects, the distance between the substrate 108 and the cathode may range from about 1 mm to about 0.5 m. The power employed to generate the plasma may range from about 1 watt to about 1 Killowatt or more, e.g., about 5 Killowatts or more. In certain aspects, the plasma beam 104 is contacted with the substrate surface 106 in a direction that is substantially orthogonal to the plane of the substrate surface 106 on which the structures are to be produced. By "substantially orthogonal" is meant that the angle of the ion beam flow as it contacts the plane of the substrate ±15°, such as ±10°, including ±5° of orthogonal, including orthogonal, such that in certain aspects the ion beam flow is normal to the plane of the substrate surface 106.

As such, aspects of the methods include methods for deposition of stress-free films or layers utilized in medical implants wherein the properties of the layer materials are stress-dependent by applying heating or cooling to the substrate 108 (or compressive force) of choice during the layer formation to impose through the substrate 108 an applied force condition- opposing or enhancing the retention of stress (e.g., compressive or tensile force) in the product layer. The method of the invention has particular importance for relatively thick (up to 100 microns) biocompatible metals such as platinum, iridium and titanium used as interconnections; iridium oxide and titanium nitride electrodes as well as various dielectric films used for biomedical encapsulation.

This method is also applicable in the converse to the production of layers that have tensile growth stress. In such case, the thermal expansion mismatch strain can be compensated in the practice of the invention by heating the substrate 108 at the deposition temperature. In this way, there is little or no stress during deposition, and a stress is created during cooling, but the stress is then relieved by removing the wafer constraint.

In certain aspects, the substrate surface 106 has secured thereto a member formed of a material having a different coefficient of thermal expansion from the substrate 108, and wherein the formation of the product film of the film- forming material comprises heating and/or cooling of the substrate 108 and member secured thereto.

Depending on the particular aspect, the substrate surface 106 may be smooth or irregular, where when the substrate surface 106 is irregular in may have holes or trenches or analogous structures that are to be filled with the deposited material.

In certain aspects of the method of the present invention, deposition conditions (e.g., gas makeup, power) may be selected which yield a porous coating. For example, the pressure of the reactive gases may be chosen to provide for a desired porosity in the final product. For example, where $N_2$ is the reactive gas, pressures ranging from 0.01 to 760 torr, such as 0.1 to 100 torr, are employed to produce a porous structure of many metals, such as platinum, gold, ruthenium, iridium and molybdenum. Where $C\Sigma H\beta$ is the reactive gas, pressures ranging from 0.01 to 760 torr, such as 0.1 to 100 torr, are employed to produce a porous structure of many metals, such as platinum, gold, ruthenium, iridium and molybdenum. Further details regarding deposition conditions of interest are provided in copending PCT Application serial no. PCT/US2007/ titled: "Metal Binary and Ternary Compounds Produced by Cathodic Arc Deposition," filed on even date herewith, the disclosure of which is herein incorporated by reference. In certain aspects, one or more masks may be employed in conjunction with the cathodic arc deposition protocol. Such masks may provide for any desirable shape of deposited structured. Any convenient mask, such as conventional masks employed in photolithographic processing protocols, etc., may be employed. As described above, the structure that is deposited by the subject methods may have a variety of different configurations, and may be a layer, a lead, have a three-dimensional configuration, etc., depending on the intended function of the deposited structured.

The composition of the deposited structure may be selected based on the choice of cathode material and atmosphere of plasma generation. As such, a particular cathode material and atmosphere of plasma generation are selected to produce a metallic layer of desired composition. In certain aspects, the cathode is made up of a metal or metal alloy, where metals of interest include, but are not limited to: gold (au), silver (ag), nickel (ni), osmium (os), palladium (pd), platinum (pt), rhodium (rh), iridium (ir) titanium (ti), and the like.

The ion beam may be produced in a vacuum in those aspects where the deposited structure is to have the same composition as the cathode. In yet other aspects where the deposited structure is to be an alloy of a metal with another element, such as a carbon, oxygen or nitrogen, the plasma may be produced in an atmosphere of the other element, e.g., an oxygen containing atmosphere, a nitrogen containing atmosphere, a carbon containing atmosphere, etc.

In certain aspects, a gradient of a second element in the cathode material is produced in the deposited structure, e.g., by modifying the atmosphere while the plasma is being generated, such that the amount of the second element in the atmosphere is changed, e.g., increased or decreased, while deposition is occurring.

In certain aspects, the ion beam that is contacted with the substrate surface 106 is unfiltered, such that the ion beam includes macroparticles of the cathode material. In yet other aspects, the ion beam may be filtered such that the beam is substantially if not completely free of macroparticles is contacted with the substrate surface 106. Any convenient filtration protocol may be employed, such as those described in U.S. Pat. Nos. 6,663,755; 6,031,239; 6,027,619; 5,902,462; 5,317,235 and 5,279,723 and published U.S. Application Nos. 20050249983; 20050181238; 20040168637; 20040103845 and 20020007796; the disclosures of which are herein incorporated by reference.

As reviewed above, in certain aspects, the cathodic arc deposited structure is a conductive element that conductively joins two or more structures of an implantable medical device, e.g., a conductive feed-through or via as shown in FIGS. 6A and 6B. In certain of these aspects, a multi-layered biocompatible structure intended for use as an implant in a human body is fabricated in which a microprocessor or other component is configured in different layers and interconnected vertically through insulating layers which separate each circuit layer of the structure, where the vertical interconnection is produced via cathodic arc deposition as described herein. Each circuit layer can be fabricated in a separate wafer or thin film material and then transferred onto the layered structure and interconnected as described below.

A biocompatible layer metal conductor, e.g., made up of Pt, Ir, Ti, or alloys thereof, is deposited on the patterned silicon substrate 108 via cathodic arc deposition techniques, e.g., through an external (e.g., silicon) mask to a define three-dimensional electrical circuit and an electrical connection through vias formed in the silicon substrate 108 or case containing a microprocessor or other component. These methods include exposing the first portion to a beam of substantially fully ionized metallic ions like, e.g., as produced above. The method uses unfiltered as well filtered Cathodic Vacuum Arc techniques to generate the highly directional ion beam and permits the formation of a conformal metal coating, even in high aspect ratio vias and trenches. The method also permits the in-filling of vias and trenches to form conductive interconnects, e.g., deposition of platinum thin and thick films and interconnections In certain aspects, the structures are vertically stacked and interconnected circuit elements for data processing, control systems, and programmable computing for use in implantable devices. In certain aspects, the structures include interconnecting circuitry and microprocessors which are fabricated in the same or separate semiconductor wafers and then stacked. This circuitry may include a number of thin film metal wires that are normally routed along the surface of silicon or other suitable material. In the present invention the functional blocks of the circuit may be divided into two or more vertically arranged sections with one section of the circuit on a bulk chip and the remaining blocks, like SI based wafer with cavities which contain an embedded microprocessor chip and components, being electrically connected through an intervening vias produced via the cathodic arc deposition protocols described herein. Circuits can be formed in bulk silicon, silicon oxide, or in HI-V materials such as gallium arsenide, or in composite structures including bulk Si, SOI, and/or thin film GaAs. The various layers of the device can be stacked using an insulating layer that bonds the layers together and conductive interconnects or vertical busses extending through the insulating layer which may include a polymeric material such as an adhesive. Thermal and electrical shielding can be employed between adjacent circuit layers to reduce or prevent thermal degradation or cross-talk.

Cathodic Arc Deposition Systems

Also provided are cathodic arc deposition systems that may be employed in practicing the subject methods to make implantable medical devices that include cathodic arc produced structures. Aspects of the subject systems include a cathodic arc plasma source and a substrate mount. The cathodic arc plasma source (i.e., plasma generator) may vary, but in certain aspects includes a cathode, one or more anodes and a power source between the cathode and anode(s) for producing an electrical arc sufficient to produce ionized cathode material from the cathode during plasma generation. The plasma generator may generate a DC or pulsing plasma beam 104, including positively charged ions from a cathode target. The substrate mount is configured for holding a substrate 108 on which a structure is to be deposited. In certain aspects, the substrate mount is one that includes a temperature modulator for controlling the temperature of a substrate 108 present on the mount, e.g., for increasing or decreasing the temperature of a substrate 108 on the mount to a desired value. Any convenient temperature modulator may be operatively connected to the mount, such as a cooling element, heating element etc. In certain aspects, a temperature sensor may be present for determining the temperature of a substrate 108 present on the mount. In certain aspects, the system is configured so that the distance between the substrate 108 mount and the cathode may be adjusted. In other words, the system is configured such that the substrate mount and cathode may be moved relative to each other. In certain aspects, the system is configured so that the substrate mount can be moved relative to the cathode so that the distance between the two can be increased or decreased as desired. In certain aspects, the system is configured so that the cathode can be moved relative to the substrate mount so that the distance between the two can be increased or decreased as desired. As desired, the system may include an element for determining the proper distance to position the substrate mount and cathode relative to each other in view of one or more input parameters, e.g., cathode material, energy, substrate specifics, deposition atmosphere, to produce a thick, stress-free product layer, e.g., by ensuring that any compressive forces present in the deposited material are canceled by tensile forces of the substrate 108, as reviewed above. The cathodic arc plasma generation element and substrate 108 are, in certain aspects, present in a sealed chamber which provides for the controlled environment, e.g., a vacuum or controlled atmosphere, where the two components of the system may be present in the same chamber or different chambers connected to each other by an ion conveyance structure which provides for movement of the ions from the cathode to the substrate 108.

In certain aspects, the system further includes a filter component which serves to filter macroparticles from the produced plasma so that a substantially if not completely macroparticle free ion beam contacts the substrate 108. Any convenient filtering component may be present, where filtering components of interest include, but are not limited to: those described in U.S. Pat. Nos. 6,663,755; 6,031,239; 6,027,619; 5,902,462; 5,317,235 and 5,279,723 and published U.S. Application Nos. 20050249983; 20050181238; 20040168637; 20040103845 and 20020007796; the disclosures of which are herein incorporated by reference. In certain aspects, the filter element has two bends such that there is no line of sight and no single bounce path through the filter between the source and the substrate 108. In certain aspects, the system further includes a beam steering arrangement, which steers the plasma beam 104 through a filter and onto the substrate 108. In certain aspects, the system includes an ion beam modulator, e.g., a beam biasing arrangement for applying a pulsed, amplitude modulated electrical bias to a filtered plasma beam 104. In these aspects, the biasing arrangement comprises a processing device and a pulse generator module, the pulse generator module generating the pulsed, amplitude modulated electrical bias under the control of the processing device in which the pulse generator module includes a programmable logic device, a power supply and a switching circuit, the switching circuit being controlled by the programmable logic device and an output of the power supply being coupled to the substrate 108 via the switching circuit, wherein the programmable logic device controls the operation of both the power supply and the switching circuit.

In certain aspects, the system further includes an element for biasing the substrate 108. In certain of these aspects, the biasing operates both to dissipate electrostatic charge accruing on the substrate 108 due to the deposition of positive ions and to ensure that the energy of incident ions falls in a predetermined energy range.

Cathodic arc deposition systems are further described in U.S. Provisional Application Ser. No. 60/805,576 titled "Implantable Medical Devices Comprising Cathodic Arc Produced Structures," and filed on Jun. 22, 2006; the disclosure of which are herein incorporated by reference.

Systems

Figure 8:
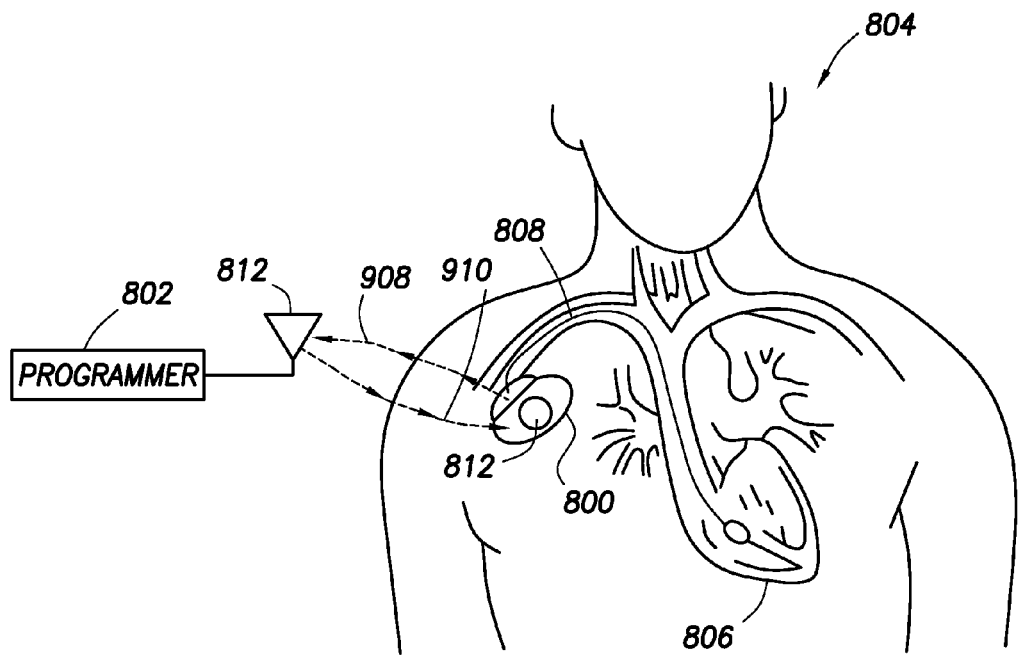
FIG. 8 is a simplified schematic view of an implantable medical device and an external programmer employing the improved RF telemetry antenna of the present invention.

Also provided are systems that include one more implantable medical devices that include a cathodic arc produced component according to the invention. For example, systems that include an implantable device having a cathodic arc produced antenna, such as a patch antenna, e.g., as described above, are provided. Such systems of the invention may be viewed as systems for communicating information within the body of subject, e.g., human, where the systems include both a first implantable medical device comprising a transceiver configured to communicate information; and a second device comprising a transceiver configured to communicate information, wherein at least one of the first and second devices includes a microstrip antenna according to the invention, e.g., as described above. One aspect of a system of the invention is shown in FIG. 8, where the system includes an implantable medical device, e.g., an IPG, and an external programming unit. FIG. 8 is a simplified schematic diagram of bi-directional telemetry communication between an external programmer 802 and an implanted medical device, e.g., a cardiac pacemaker IPG 800, in accordance with the present invention. The IPG 800 is implanted in the patient 804 beneath the patient's skin or muscle and is typically oriented to the skin surface. IPG 800 is electrically coupled to the heart 806 of the patient 804 through pace/sense electrodes and lead conductor(s) of at least one cardiac pacing lead 808. The IPG 800 contains an operating system that may employ a microcomputer or a digital state machine for timing sensing and pacing functions in accordance with a programmed operating mode and a power source. The IPG 800 also contains sense amplifiers for detecting cardiac communication, patient activity sensors or other physiologic sensors for sensing the need for cardiac output, and pulse generating output circuits for delivering pacing pulses to at least one heart chamber of the heart 806 under control of the operating system in a manner well known in the prior art. The operating system includes memory registers or RAM for storing a variety of programmed-in operating mode and parameter values that are used by the operating system. The memory registers or RAM may also be used for storing data compiled from sensed cardiac activity and/or relating to device operating history or sensed physiologic parameters for telemetry out on receipt of a retrieval or interrogation instruction. All of these functions and operations are well known in the art, and many are employed in other programmable, implantable medical devices to store operating commands and data for controlling device operation and for later retrieval to diagnose device function or patient condition. Programming commands or data are transmitted between an IPG RF telemetry antenna 810 within or on a surface of the IPG 800 and an external RF telemetry antenna 812 associated with the external programmer 802. The external RF telemetry antenna 812 can be located on the case of the external programmer some distance away from the patient 804. For example, the external programmer 802 and external RF telemetry antenna 812 may be on a stand a few meters or so away from the patient 804. Moreover, the patient may be active and could be exercising on a treadmill or the like during an uplink telemetry interrogation of real time ECG or physiologic parameters. The programmer 802 may also be designed to universally program existing IPGs that employ the conventional ferrite core, wire coil, RF telemetry antenna of the prior art and therefore also have a conventional programmer RF head and associated software for selective use with such IPGs.

In an uplink telemetry transmission 908, the external RF telemetry antenna 812 operates as a telemetry receiver antenna, and the IPG RF telemetry antenna 810 operates as a telemetry transmitter antenna. Conversely, in a downlink telemetry transmission 30, the external RF telemetry antenna 812 operates as a telemetry transmitter antenna, and the IPG RF telemetry antenna 810 operates as a telemetry receiver antenna.

Figure 9:
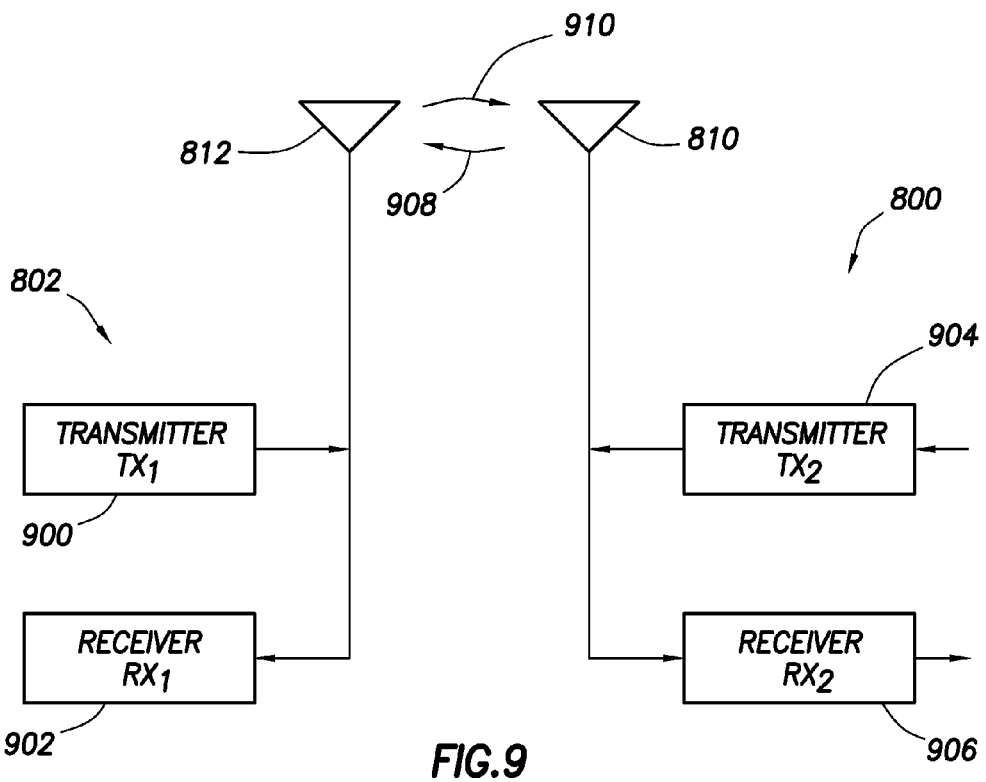
FIG. 9 is a simplified circuit block diagram of major functional telemetry transmission blocks of the external programmer and IPG of FIG. 8.

Referring now to FIG. 9, FIG. 9 depicts a simplified circuit block diagram of major functional telemetry transmission blocks of the external programmer 802 and IPG 800 of FIG. 8. The external RF telemetry antenna 812 within the programmer 802 is coupled to a telemetry transceiver comprising a telemetry transmitter 900 and telemetry receiver 902. The telemetry transmitter 900 and telemetry receiver 902 are coupled to control circuitry and registers operated under the control of a microcomputer and software as described in the above-incorporated, commonly assigned, patents and pending applications. Similarly, within the IPG 800, the IPG RF telemetry antenna 810 is coupled to a telemetry transceiver comprising a telemetry transmitter 904 and telemetry receiver 906. The telemetry transmitter 904 and telemetry receiver 906 are coupled to control circuitry and registers operated under the control of a microcomputer and software as described in the above- incorporated, commonly assigned, patents and pending applications.

In an uplink telemetry transmission 908, the telemetered data may be encoded in any convenient telemetry formats. For example, the data encoding or modulation may be in the form of frequency shift key (FSK) or differential phase shift key (DPSK) modulation of the carrier frequency, for example. To initiate an uplink telemetry transmission 908, the telemetry transmitter 900 in external programmer 802 is enabled in response to a user initiated INTERROGATE command to generate an INTERROGATE command in a downlink telemetry transmission 910. The INTERROGATE command is received and demodulated in receiver 906 and applied to an input of the implantable medical device central processing unit (CPU), e.g. a microcomputer (not shown). The implantable medical device microcomputer responds by generating an appropriate uplink data communication that is applied to the transmitter 904 to generate the encoded uplink telemetry communication 908. Any of the above described data encoding and transmission formats may be employed.

The system of FIGS. 8 and 9 described above is merely illustrative and only one type of system in which the subject antennas may be employed. The systems may have a number of different components or elements, where such elements may include, but are not limited to: sensors; effectors; processing elements, e.g., for controlling timing of cardiac stimulation, e.g., in response to a communication from one or more sensors; telemetric transmitters, e.g., for telemetrically exchanging information between the implantable medical device and a location outside the body; drug delivery elements, etc.

In certain aspects, the implantable medical systems are ones that are employed for cardiovascular applications, e.g., pacing applications, cardiac resynchronization therapy applications, etc.

Use of the systems may include visualization of data obtained with the devices. Some of the present inventors have developed a variety of display and software tools to coordinate multiple sources of sensor information which will be gathered by use of the inventive systems. Examples of these can be seen in international PCT application serial no. PCT/US2006/012246; the disclosure of which application, as well as the priority applications thereof are incorporated in their entirety by reference herein.

Data obtained using the implantable aspects in accordance with the invention, as desired, can be recorded by an implantable computer. Such data can be periodically uploaded to computer systems and computer networks, including the Internet, for automated or manual analysis. Uplink and downlink telemetry, capabilities may be provided in a given implantable system to enable communication with either a remotely located external medical device or a more proximal medical device on the patient's body or another multi-chamber monitor/therapy delivery system in the patient's body. The stored physiologic data of the types described above as well as real-time generated physiologic data and non-physiologic data can be transmitted by uplink RF telemetry from the system to the external programmer or other remote medical device in response to a downlink telemetry transmitted interrogation command. The real-time physiologic data typically includes real time sampled communication levels, e.g., intracardiac electrocardiogram amplitude values, and sensor output communication including dimension communication developed in accordance with the invention. The non-physiologic patient data includes currently programmed device operating modes and parameter values, battery condition, device ID, patient ID, implantation dates, device programming history, real time event markers, and the like. In the context of implantable pacemakers and ICDs, such patient data includes programmed sense amplifier sensitivity, pacing or cardioversion pulse amplitude, energy, and pulse width, pacing or cardioversion lead impedance, and accumulated statistics related to device performance, e.g., data related to detected arrhythmia episodes and applied therapies. The multi-chamber monitor/therapy delivery system thus develops a variety of such realtime or stored, physiologic or non-physiologic, data, and such developed data is collectively referred to herein as "patient data".

Figure 10:
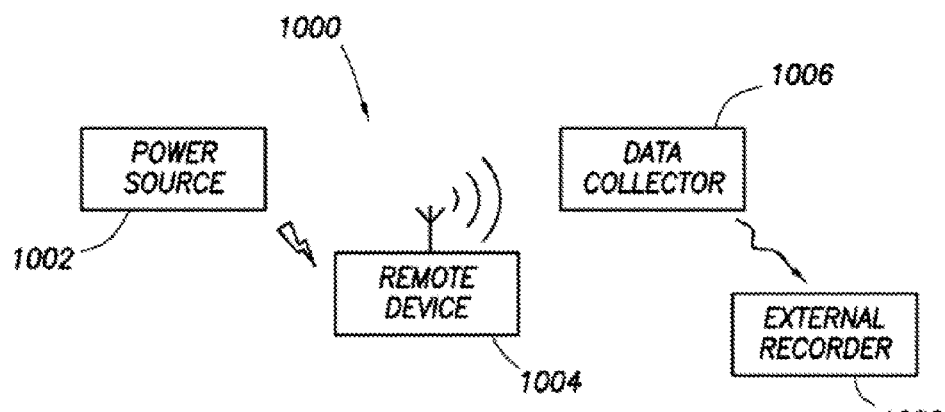
FIG. 10 is a simplified circuit block diagram of major functional uplink and downlink telemetry transmission functions of the external programmer and implantable medical device of FIG. 10.

FIG. 10 is a block diagram of a medical diagnostic and/or treatment system 1000 according to another aspect of the present invention. Platform 100 includes a power source 1002, a remote device 1004, a data collector 1006, and an external recorder 1008. In operation, remote device 1004 is placed inside a patient's body (e.g., ingested or implanted) and receives power from power source 1002, which may be located inside or outside the patient's body.

Remote device 1004, is an electronic, mechanical, or electromechanical device that may include any combination of sensor, effector and/or transmitter units. A sensor unit detects and measures various parameters related to the physiological state of a patient 804 in whom remote device 1004 is implanted. An effector unit performs an action affecting some aspect of the patient's body or physiological processes under control of a sensor unit in the remote device or an external controller. A transmitter unit transmits communication, including, e.g., measurement data from a sensor unit or other communication indicating effector activity or merely presence of the remote device, to data collector 106. In certain aspects, transmission is performed wirelessly.

Power source 1002, can include any source of electrical power that can be delivered to remote device 1004. In some aspects, power source 1002 may be a battery or similar self-contained power source incorporated into remote device 1004. In other aspects, power source 1002 is external to the patient's body and delivers power wirelessly.

Data collector 1006 may be implanted in the patient 804 or external and connected to the patient's skin. Data collector 1006 includes a receiver antenna that detects communication from a transmitter unit in remote device 1004 and control logic configured to store, process, and/or retransmit the received information. In aspects where remote device 1004 does not include a transmitter, data collector 106 may be omitted.

External recorder 1008 may be implemented using any device that makes the collected data and related information (e.g., results of processing activity in data collector 106) accessible to a practitioner. In some aspects, data collector 106 includes an external component that can be read directly by a patient 804 or health care practitioner or communicably connected to a computer that reads the stored data, and that external component serves as external recorder 108. In other aspects, external recorder 1008 may be a device such as a conventional pacemaker wand that communicates with an internal pacemaker can or other data collector, e.g., using RF coupling in the 405-MHz band.

Platform 1000 can include any number of power sources 1002 and remote devices 1004, which may be viewed as implantable medical devices. In some aspects, a sensor/effector network (system) can be produced within the patient's body to perform various diagnostic and/or treatment activities for the patient 804. The description of the present invention is provided herein in certain instances with reference to a patient 804. As used herein, the term "patient" refers to a living entity such as an animal. In certain aspects, the animals are "mammals" or "mammalian," where these terms are used broadly to describe organisms which are within the class mammalia, including the orders carnivore (e.g., dogs and cats), rodentia (e.g., mice, guinea pigs, and rats), lagomorpha (e.g. rabbits) and primates (e.g., humans, chimpanzees, and monkeys). In certain aspects, the subjects, e.g., patients 804, are humans.

Also provided are methods of using the systems of the invention. The methods of the invention generally include: providing a system of the invention, e.g., as described above, that includes first and second medical devices, one of which may be implantable; and enabling a communication between the first and second devices of the system via a microstrip antenna present on at least one of the devices. The providing step may include implanting at least the first medical device into a subject, depending on the particular system being employed. In certain aspects, the enabling step includes sending a communication from the first to said second device. In certain aspects, the transmitting step includes sending a communication from the second device to said first device. The communication may be in any convenient frequency, wherein certain aspects the frequency ranges from about 400 to about 405 MHz. The nature of the communication may vary greatly, and may include one or more data obtained from the patient 804, data obtained from the implanted device on device function, control information for the implanted device, power, etc.

Figure 11:
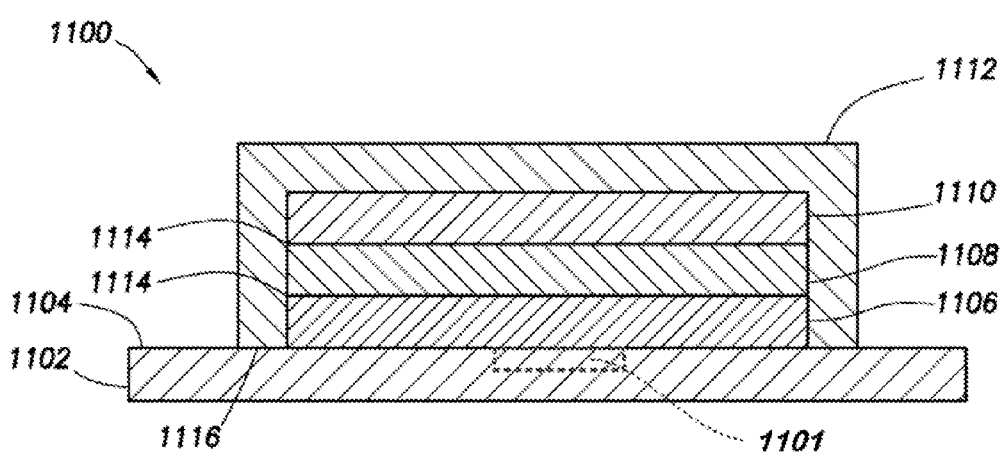
FIG. 11 shows a solid-state thin-film capacitor according to one aspect.

Referring now generally to the Figures and particularly to FIG. 11, FIG. 11 shows a solid-state thin film capacitor 1100. Capacitor 1100 may be formed on a substrate 1102, such as but not limited to, silicon. The layers of the capacitor 1100 may be built up on a top surface 1104 of the substrate 1102. For example, a first electrode layer 1106 may be comprised of a transition metal, such as but not limited to tantalum. A dielectric layer 1108 may be comprised of an oxide of the transition metal, such as but not limited to tantalum pentoxide (Ta2O5). A second electrode layer 1110 may be comprised of a metal oxide, such as but not limited to manganese dioxide (MnO2). For clarity, the layers and other features of FIG. 11 are shown having certain thicknesses and other dimensions that are not necessarily drawn to scale. However, it is to be understood that in practice, other dimensions and aspect ratios may be employed, as described herein. An electrical circuit element 1101 is positioned within the semiconductor substrate 1102 and enclosed by the semiconductor substrate 1102 and the first electrode layer 1106, whereby the thin-film capacitor 1100 extends from the first surface 1104 of the semiconductor substrate 1102 and the electrical circuit element 1101 is enclosed by the thin-film capacitor 1100 and the semiconductor substrate 1102.

Capacitor 1100 may be hermetically sealed by a sealing layer 1112 on the top surface 1104 of substrate 1102 over the layers 1106, 1108 and 1110 of the capacitor 1100. Sealing layer 1112 may be a thin-film passivation layer. As shown, sealing layer 1112 cooperates with substrate 1102 to form an envelope that seals layers 1106, 1108 and 1110 from the surrounding environment. A particular point of vulnerability for layers 1106, 1108 and 1110 are edges 1114. If edges 1114 are not protected, corrosive fluids or substances may permeate between layers 1106, 1108 and 1110 causing delamination and failure of the capacitor. Accordingly, sealing layer 1112 covers edges 1114. Sealing layer also covers peripheral portions 1116 of the top surface 1104 of substrate die 1102 to ensure that edges 114 of layers 1106, 1108 and 1110 are protected. Although not shown, conductive feed-throughs are provided to the first and second electrode layers 1106 and 1110 of the capacitor 1100 to provide for electrical communication between the sealed capacitor 1100 and components outside of the sealing layer 1112.

Capacitors 1100 of the invention are thin-film capacitors 1100. As the capacitors 1100 are thin-film capacitors 1100, the capacitors 1100 include layers 1106, 1108 and 1110, such as one or more of the first electrode layer 1106, the dielectric layer 1108, and the second electrode layer 1110, where these layers 1106, 1108 and 1110 are thin. As the capacitor layers 1106, 1108 and 1110 are thin, they may have an average thickness of 10 μm or less, such as 7 μm or less, including 5 μm or less, for example, 3 μm or less, in some cases 1 μm or less, such as 0.1 μm or less. In some instances, the layers 1106, 1108 and 1110 have a thickness ranging from 0.1 to 100 μm, such as from 0.1 to 10 μm, such as from 0.1 to 7 μm, including from 0.1 to 5 μm, for example 0.1 to 3 μm, such as 0.1 to 1 μm. Thin-film capacitors 1100 of the invention may be configured to minimize the size and weight of the capacitor 1100, but still maintain a capacitance value in a useful range.

The solid-state thin-film capacitors 1100 may have a small overall size. Where desired, the solid-state thin-film capacitors 1100 may be configured to be part of an integrated circuit. In some instances the solid-state thin-film capacitors 1100 occupy an overall area of 50 mm2 or less, such as 10 mm$^2$ or less and including 1 mm$^2$ or less. The capacitance of the solid-state thin-film capacitors 1100 of the invention may vary. In some instances, solid-state thin-film capacitors 1100 of the invention are configured to have a capacitance ranging from 0.01 μF/mm$^2$ to 1 F/mm$^2$, such as 0.01 μF/mm$^2$ to 0.5 μF/mm$^2$, including 0.02 μF/mm$^2$ to 0.2 μF/mm$^2$.

Aspects of solid-state thin-film capacitors 1100 of the invention include a first electrode layer 1106, a dielectric layer 1108 present on the first electrode layer 1106, and a second electrode layer 1110 present on the dielectric layer 1108. As such, the solid-state thin-film capacitors 1100 of the invention include first and second electrode layers 1106 and 1110 separated from each other by a dielectric layer 1108 of a solid material.

The first and second electrode layers 1106 and 1110 may have any convenient configuration. Of interest are the first and second electrode layers 1106 and 1110 that are configured as parallel plates which are separated by the dielectric layer 1108. The plates may have a variety of different configurations, including conformal configurations in which the configuration of one of the plates conforms to the configuration of another of the plates. In some instances, the first electrode layer 1106 and the second electrode layer 1110 are planar parallel plates separated from each other by the dielectric layer 1108.

The first electrode layer 1106 may be made up of any convenient electrically conductive material, including pure metals, metal alloys, etc. Specific metals of interest include, but are not limited to transition metals, such as tantalum, silver, copper, gold, iron, titanium, chromium, tungsten, nickel, and cobalt. Alloys of such transition metals are also of interest. The thickness of the first electrode layer 1106 may vary. Of interest are first electrode layer 1106s that have an average thickness of 10 μm or less, such as 7 μm or less, including 5 μm or less, for example, 3 μm or less, and in some cases 1 μm or less. Where desired, the average thickness of the first electrode layer 1106 may range from 0.1 to 10 μm, such as from 0.1 to 7 μm, including from 0.1 to 5 μm, for example 0.1 to 3 μm, such as 0.1 to 1 μm. In some instances, the first electrode layer 1106 has an average thickness of 5 μm. As reviewed above, the configuration of the first electrode layer 1106 may vary. Where the first electrode layer 1106 is configured as a planar plate, the planar plate may have suitable dimensions for the intended use of the capacitor 1100. In some instances, the first electrode layer 1106 is configured to occupy an overall area of 50 mm$^2$ or less, such as 10 mm or less and including 1 mm$^2$ or less.

The dielectric layer 1108 that is present on the first electrode layer 1106 such that the dielectric layer 1108 separates the first and second electrode layer 1110s may be fabricated from a variety of different insulative materials. In some instances, the dielectric layer 1108 includes a nonconductive insulator material, such as, but not limited to tantalum oxide, niobium oxide, titanium oxide, zirconium oxide, combinations thereof, and the like. In some cases, the dielectric layer 1108 is an oxide of the transition metal used in the first electrode layer 1106. In certain instances, the dielectric layer 1108 includes tantalum pentoxide ($Ta_2O_5$). The thickness of the dielectric layer 1108 may vary. In some cases, the dielectric layer 1108 has an average thickness of 5 μm or less, such as 3 μm or less, in some cases 1 μm or less including 0.1 μm or less, for example 0.05 μm or less. Of interest are dielectric layer 1108s having an average thickness ranging from 0.01 to 5 μm to, such as from 0.01 to 3 μm, including from 0.05 to 1 μm, for example 0.1 to 0.5 μm. In some instances, the dielectric layer 1108 has an average thickness of 0.1 μm.

The second electrode layer 1110 may be fabricated from any convenient conductive material. Of interest are second electrode layer 1110s that are made up of a metal oxide, such as, but not limited to manganese dioxide, iridium oxide, platinum oxide, palladium oxide, ruthenium oxide, combinations thereof, and the like. In some instances, the second electrode layer 1110 includes manganese dioxide ($MnO_2$). As with the first electrode layer, the second electrode layer 1110 may vary in thickness. In some instances, the second electrode layer has an average thickness of 10 μm or less, such as 7 μm or less, including 5 μm or less, for example, 3 μm or less, and in some cases 1 μm or less. Of interest are second electrode layers 1110 having an average thickness ranging from 0.1 to 30 μm, such as from 0.1 to 7 μm, including from 0.1 to 5 μm, for example 0.1 to 3 μm, such as 0.1 to 1 μm. In some instances, the second electrode layer 1110 has an average thickness of 5 μm. As reviewed above, the configuration of the second electrode layer 1110 may vary. Where the second electrode layer 1110 is configured as a planar plate, the planar plate may have suitable dimensions for the intended use of the capacitor 1100. The dimensions of the second electrode layer 1110 may or may not match the dimensions of the first electrode layer 1106. In some instances, the second electrode layer 1110 is configured to occupy an overall area of 50 mm$^2$ or less, such as 10 mm$^2$ or less and including 1 mm$^2$ or less.

Where desired, the first and/or second electrode layers 1106 and 1110 of the capacitor 1100 include surfaces having a high surface area. Accordingly, the first and/or second electrode layers 1106 and 1110 may be high surface area electrodes. By "high surface area" is meant a layer having an actual surface that has a surface area which is greater than the surface area of a corresponding alternate planar substrate surface 1102 that is defined solely by the orthogonal length and width dimensions of the actual surface of the substrate surface 1102. For example, the actual surface may be the upper surface of the rectangular layer and therefore have a length and width. Because of features on the surface, e.g., porosity, crenulations, etc., the actual surface of the first and/or second electrode layers 1106 and 1110 has a surface area that is greater than the surface area of a surface having the same orthogonal length and width dimensions as the substrate surface 1102 but which is free of such features, i.e., the surface is smooth. This latter substrate surface 1102 that has a surface area defined solely by the orthogonal length and width dimensions and which is smooth is the corresponding virtual surface of the actual surface. In other words, the corresponding virtual surface of the actual surface is the surface that would be defined by solely the length and width of the actual surface of interest and which assumes a completely smooth surface with no surface features that would increase the surface area of the surface. As such, the actual surface of the electrode layer 1106 and 1110 of interest is one that has a surface area which is greater than the surface area of a corresponding virtual surface defined solely by the length and width dimensions of the actual surface. In some instances, the surface area of the surface of interest is 2-fold or greater, such as 5-fold or greater, including 10-fold or greater, than the corresponding surface area of the surface defined solely by the length and width dimensions of the surface. In certain instances, the actual surface area of the surface of interest of the electrode layer is 1106 or 1110 or greater, such as or greater and including or greater than the corresponding surface area defined solely by the length and width 6 dimensions of the surface of interest of the electrode layer 1106 or 1110. In certain instances, the surface area of a surface of the electrode layer 1106 or 1110 ranges from 0.01 $mm^2$ to 100 $mm^2$, such as from 0.1 $mm^2$ to 50 $mm^2$ and including from 1 $mm^2$ to 10 $mm^2$. Surface area of a given surface of an electrode layer 1106 or 1110 can be determined by comparing the electrochemical capacitance or cyclic voltammogram of the high surface area layer (for example present as rough or porous layer) with that of a smooth layer of the same material. Roughness may also be determined by other techniques, such as atomic force microscopy (AFM), electron microscopy, or Brunauer-Emmett-Teller (BET) analysis. To provide for the desired high surface area, the electrode layers 1106 and 1110 may include a rough or porous surface. The porosity or roughness of the electrode layers 1106 and 1110 may vary, so long as it imparts the desired high surface area to the surface of the electrode layer 1106 and 1110. Alternatively, the electrode layers 1106 and 1110 of the capacitor 1100 may have surface crenulations 300 which impart the desired high surface area. By surface crenulations 300 is meant a series of projections separated by notches or crevices. The depth of a given notch as measured from the top of a given projection ranges, in certain instances, from 0.1 µm to 1000 µm, such as from 1 µm to 10 µm.

FIG. 3 provides views of 10 mm thick layer of platinum 200 exhibiting surface crenulations 300 produced according to one aspect of the invention.

The thin-film layers 1106, 1108 and 1110 of the capacitors 1100 may be positioned on a surface of a solid support. The solid support may be small, for example where it is dimensioned to have a width ranging from 0.01 mm to 100 mm, such as from 0.1 mm to 20 mm, and including from 0.5 mm to 2 mm; a length ranging from 0.01 mm to 100 mm, such as from 0.1 mm to 20 mm, and including from 0.5 mm to 2 mm, and a height ranging from 0.01 mm to 10 mm, including from 0.05 mm to 2 mm, and including from 0.1 mm to 0.5 mm. The solid support element may take a variety of different configurations, such as but not limited to: a chip configuration, a cylinder configuration, a spherical configuration, a disc configuration, etc. A particular configuration may be selected based on an intended application, a method of manufacture, etc. While the material from which the solid support is fabricated may vary considerably depending on the particular device for which the device is configured for use, in certain instances the solid support is made up of a semiconductor material, such as silicon.

In some instances, high surface area electrodes as described in PCT application serial no. PCT/US2008/053999 published as WO/2008/101107 (the disclosure of which is herein incorporated by reference) are employed as first and/or second electrode layers 1106 and 1110 of the capacitors 1100 of the invention.

Where desired, the solid-state thin-film capacitors 1100 of the invention may include a hermetic sealing structure 1112 that seals the capacitor 1100 from the implanted environment so that the capacitor 1100 maintains functionality, at least for its intended lifespan. The nature of the hermetic sealing structure 1112 may vary, so long as it maintains the functionality of the capacitor 1100 in the implanted environment for the desired period of time, such as one day or longer, one week or longer, one month or longer, one year or longer, five years or longer, ten years or longer, twenty-five years or longer, forty years or longer.

In some instances, the hermetic sealing structure 1112 is a conformal, void-free sealing layer, where the sealing layer is present on at least a portion of the outer surface of the capacitor 1100. In some instances, this conformal, void-free sealing layer may be present on substantially all of the outer surfaces of the capacitor 1100. Alternatively, this conformal, void-free sealing layer 1112 may be present on only some of the surfaces of the capacitor 1100, such as on only one surface or even just a portion of one surface of the capacitor 1100. As such, some capacitors 1100 of the invention are completely encased in a conformal, void-free sealing layer 1112. In such instances, conductive feed-throughs are provided to allow electrical communication between the capacitor encased in the sealing layer 1112 and other components or devices located outside of the encasing sealing layer 1112. Other capacitors 1100 are configured such that only the top surface of a capacitor is covered with the conformal, void-free sealing layer 1112.

The conformal, void-free sealing layer 1112 may be a "thin-film" coating, in that its thickness is such that it does not substantially increase the total volume of the capacitor 1100 with which it is associated. Any increase in volume of the structure that can be attributed to the layer may be 10% or less, such as 5% or less, including 1% or less by volume. In some instances, the seal layer 1112 has a thickness in a range from 0.1 to 10.0 µm, such as in a range from 0.3 to 3.0 µm thick, and including in a range 1.0 µm thick.

The sealing layer may 1112 be produced on the capacitor 1100 using any of a number of different protocols, including but not limited to planar processing protocols, such as plasma-enhanced-chemical-vapor deposition, physical-vapor deposition, sputtering, evaporation, cathodic-arc deposition, low-pressure chemical vapor deposition, and etc.

Additional description of conformal, void-free sealing layers 1112 that may be employed with capacitors 1100 of the invention is provided in PCT application 5 serial no. PCT/US2007/009270 published under publication no. WO/2007/120884, the disclosure of which is herein incorporated by reference.

Also of interest as hermetic sealing structures are corrosion-resistant holders having at least one conductive feed-through and a sealing layer; where the sealing layer and holder are configured to define a hermetically sealed container that encloses the capacitor components, for example the first and second electrode layers 1106 and 1110 and dielectric layer 1108. The conductive feed-through may be a metal, such as platinum, iridium etc., an alloy of metal and a semiconductor, a nitride, a semiconductor or some other convenient material. In some instances, the corrosion-resistant holder comprises silicon or a ceramic. While dimensions may vary, the corrosion-resistant holder may have walls that are 1 mm thick or thicker, such as 50 mm thick or thicker, where the walls may range in thickness from 1 to 125 mm, including from 25 to 100 mm. The sealing layer may be metallic, where metals of interest include noble metals and alloys thereof, such as platinum and platinum alloys. Dimensions of the sealing layer may also vary, ranging in some instances from 0.5 mm thick or thicker, such as 2.0 mm thick or thicker, and including 20 mm thick or thickness, where sealing layer thicknesses may range from 0.5 to 100 mm, such as from 1 to 50 mm. In certain configurations, the structure further includes an insulative material present in the hermetically sealed volume. In some cases, the hermetically sealed volume ranges from 1 pl to 1 ml.

In some instances, the corrosion-resistant holder is a structure configured to hold a capacitor 1100 such that the capacitor 1100 is bounded on all but one side by the walls of the holder. For example, the holder may include sidewalls and a bottom, where the holder may have a variety of different configurations as long as it contains the capacitor 1100 in a manner such that the capacitor 1100 is held in a volume bounded on all but one side.

Accordingly, the shape of the holder may be square, circular, ovoid, rectangular, or some other shape as desired. Additional description of corrosion resistant holders that may be employed for sensors of the invention is provided in PCT application serial no. PCT/US2005/046815published under publication no. WO/2006/069323, the disclosure of which is herein incorporated by reference.

Solid-state thin-film capacitors 1100 of the invention may be configured to be part of an electrical circuit. As desired, the one or more capacitors 1100 may be configured to be connected in parallel or series in a given electrical circuit, or both in parallel and series in a given electrical circuit. Electrical circuits of interest may have one or more sections of the circuit, where each section includes one or more capacitors 1100 connected in series and one or more sections of the circuit are connected in parallel. Accordingly, aspects of the invention further include electrical circuits that include one or more solid-state thin-film capacitors 1100 of the invention.

Capacitors 1100 of the invention may be energy storage devices configured to store electrical energy, for example where the energy is stored on an electrode surface. Capacitors 1100 of interest include those that are configured to be a source of energy to (in other words are configured to release energy into) a device, such as a circuit device, for example an integrated circuit device. Alternatively, capacitors 1100 may be configured as filters. For example, the capacitors 1100 may be configured to allow alternating current (AC) to pass through the capacitor 1100 and to prevent direct current (DC) from passing through the capacitor 1100. Such filter-capacitors may be configured to reduce current and voltage transients across a circuit or a component of a circuit of interest, where the circuit may be a component of battery, microprocessor, transistor, resistor, inductor, etc. Where desired, the filter-capacitor 1100 may be configured to reduce the amount of noise in a circuit of interest to which it is operatively coupled.

The solid-state thin-film capacitors 1100 may be fabricated using any convenient method. In one method of interest, a first electrode layer i1106 s provided on a surface of a solid support or the substrate 1102. Next, a dielectric layer 1108 is produced on a surface of the first electrode layer 1106. Where the first electrode layer 1106 is fabricated from a transition metal, the dielectric layer 1108 may be an oxide of the transition metal. Next, a second electrode layer 1110 is deposited on the dielectric layer 1108. The second electrode layer 1110 may be fabricated from a metal oxide.

Any of a variety of different fabrication techniques may be used to produce the subject capacitors 1100. For example, molding, deposition and material removal, e.g. planar processing techniques, such as Micro-Electro-Mechanical Systems (MEMS) fabrication protocols may be employed. The various layers of the capacitor may be produced using any convenient protocol. In some instances, the layers 1106, 1108 and 1110 of the subject capacitors 1100 are produced using thin-film deposition techniques. The capacitor layers 1106, 1108 and 1110 may be produced using physical vapor deposition techniques, such as cathodic arc deposition, sputtering (e.g., sputter deposition), evaporative deposition, electron beam physical vapor deposition, pulsed laser deposition, and the like. The capacitor layers 1106, 1108 and 1110 may also be produced using chemical vapor deposition techniques, such as atmospheric pressure chemical 5 vapor deposition (APCVD), low pressure chemical vapor deposition (LPCVD), ultra-high vacuum chemical vapor deposition (UHVCVD), aerosol assisted chemical vapor deposition (AACVD), direct liquid injection chemical vapor deposition (DLICVD), microwave plasma-assisted chemical vapor deposition, (MPCVD), plasma enhanced chemical vapor deposition (PECVD), atomic layer chemical vapor deposition (ALCVD), metalorganic chemical vapor deposition (MOCVD), hot filament chemical vapor deposition (HFCVD), hybrid physical-chemical vapor deposition (HPCVD), rapid thermal chemical vapor deposition (RTCVD), and the like.

In one protocol of interest, the first electrode layer 1106 is produced by cathodic arc deposition of the first electrode layer 1106 on a surface of a solid support or the substrate 1102. Cathodic arc deposition protocols of interest include those described in PCT Application Serial No. PCT/US2007/014509 published as WO 2007/149546; the disclosure of which is herein incorporated by reference. Next, the dielectric layer 1108 is produced by oxidation of a surface of the first electrode layer 1106. Alternatively, the dielectric layer 1108 may be produced by chemical vapor deposition of the dielectric layer 1108 on the first electrode layer 1106. Where desired, the dielectric layer 1108 may be produced by a combination of oxidation and chemical vapor deposition. Next, the second electrode layer 1110 is produced by sputter deposition of the second electrode layer 1110 on a surface of the dielectric layer 1108. Following production of the capacitor layers 1106, 1108 and 1110, the capacitor layers 1106, 1108 and 1110 may be hermetically sealed in a hermetic sealing structure 1112, as reviewed above. For example, the fabrication protocol may further include producing a conformal, void-free sealing layer 1112 on the capacitor 1100 by cathodic arc deposition.

Figure 12A:
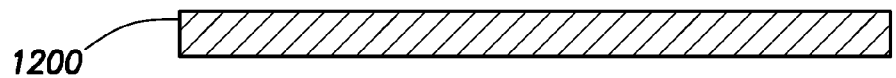
FIGS. 12A to 12E depict a method for fabricating a hermetically sealed solid-state thin film capacitor according to one aspect of the invention.
Figure 12B:
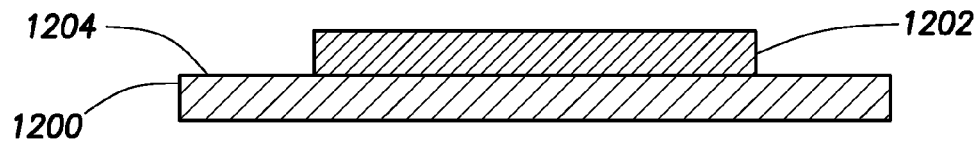
Figure 12C:
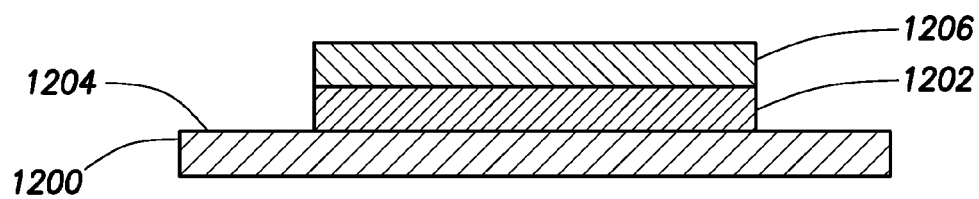
Figure 12D:
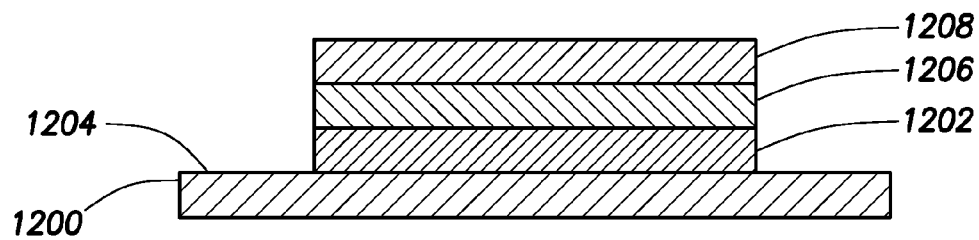
Figure 12E:
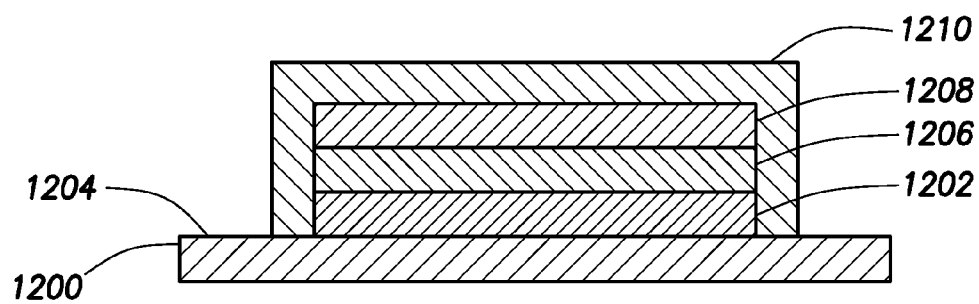

Referring now generally to the Figures and particularly to FIGS. 12A through 12E, FIGS. 12A through 12E provide a sequential series of illustrations of a processing protocol that can be employed to manufacture a hermetically sealed solid-state thin-film capacitor 1100 according to the invention. In FIG. 12A, an initial substrate 1200 is provided, where the substrate 1200 may include, in certain cases, silicon. As shown in FIG. 12B, fabrication of the capacitor 1100 begins by providing a first electrode layer 1202 on the top surface 1204 of the solid support 1200. As described herein, providing the first electrode layer 1202 may include cathodic arc deposition of the first electrode layer 1202 on the top surface 1204 of the substrate 1200. As shown in FIG. 12C, the method further includes producing a dielectric layer 1206 on the first electrode layer 1202. In some cases, production of the dielectric layer 1206 includes oxidation of the surface of the first electrode layer 1202. In other cases, production of the dielectric layer 1206 includes chemical vapor deposition of the dielectric layer 1206 on the first electrode layer 1202. As shown in FIG. 12D, the method further includes depositing a second electrode layer 1208 on the dielectric layer 1206. Deposition of the second electrode layer 1208 may include sputter deposition of the second electrode layer 1208 on the surface of the dielectric layer 1206. As shown in FIG. 12E, the method further includes producing a sealing layer 1210 on the device over capacitor layers 1202, 1206, and 1208. The sealing layer 1210 may be produced by cathodic arc deposition over capacitor layers 1106, 1108, and 1110.

Utility

The solid-state thin-film capacitors 1100 of the invention find use in a variety of different Applications. For example, the solid-state thin-film capacitors 1100 may find use as: decoupling capacitors 1100 configured to regulate voltage; decoupling capacitors 1100 configured to facilitate the reduction of noise in a circuit; bypass capacitors 1100 configured to bypass noise in a circuit; and energy storage capacitors 1100 configured to store and release energy in a circuit; among other Applications. In some cases, the capacitors 1100 find use in electronic circuits. In electronic circuits, the capacitors 1100 may find use as: filters configured to facilitate the reduction of noise in circuits; oscillation circuits configured to stably generate certain communication; tuning circuits configured to select certain communication; bypass circuits configured to compensate for temperature fluctuations; among other Applications.

The solid-state thin-film capacitors 1100 of the present invention may also find use in a circuit, RF circuits, dynamic random access memory (DRAM), non-volatile ferroelectric random access memory (NVFRAM), dynamic tunable elements in microwave devices, and the like.

The solid-state thin-film capacitors 1100 of the invention also find use in integrated circuits where it is desirable to use thin film capacitors 1100. Where the capacitors 1100 are hermetically sealed, as described above, the capacitors 1100 may be used in Applications where the capacitors 1100 and devices with which they are associated are exposed to harsh ambient conditions, such as the presence of corrosive liquids, corrosive gases, microorganisms, and the like.

Of interest is the use of the capacitors 1100 of the invention in body-associated devices, including but not limited to: implantable medical devices; devices configured for placement on a body, ingestible devices, etc. By implantable medical device is meant a device that is configured to be positioned on or in a living body. The implantable medical device may be one that is configured to be implanted in a living body. By implantable is meant that the devices are configured to maintain functionality when present in a physiological environment, including a high-salt, high-humidity environment found inside of the body of a subject, for two or more days, such as one week or longer, four weeks or longer, six months or longer, one year or longer, for example five years or longer. In certain instances, the implantable medical devices may be configured to maintain functionality when implanted at a physiological site for a period ranging from one year to eighty years or longer, such as five years to seventy years or longer, and including ten years to fifty years or longer.

The dimensions of the implantable medical devices of the invention may vary. The devices may not be not so large such that the devices cannot be positioned in an adult human.

One type of medical device of interest in which the solid-state thin-film capacitors 1100 of the invention find use is in an implantable effector device. The phrase "effector device" refers broadly to implantable devices that are sensors, activators, sensor/activators, actuators (such as electromechanical or electrical actuators) or any other device that may be used to perform a desired function in a body. In some instances, the solid-state thin-film capacitors 1100 are components, such as energy storage components, of hermetically sealed integrated circuit based effector components, where such components include a hermetically sealed integrated circuit component and an exposed effector component, such as an electrode, that is outside of any hermetic sealing structure of the integrated circuit component. Integrated circuit based effector devices in which the solid-state thin-film capacitors 1100 of the invention may find use include those described in: PCT Application Serial No. PCT/US2003/039524 published as WO/2004/052182; PCT Application Serial No. PCT/US2005/031559 published as WO/2006/029090; PCT Application Serial No. PCT/US2005/046811 published as WO/2006/069322; PCT Application Serial No. PCT/US2005/046815 published as WO/2006/069323; PCT Application Serial No. PCT/US2006/034258 published as WO/2007/028035; PCT Application Serial No. PCT/US2006/048944 published as WO/2007/075974; PCT Application Serial No. PCT/US2007/009270 published as WO/2007/120884; and PCT Application Serial No. PCT/US2007/014509 published as WO/2007/149546; the disclosures of which are herein incorporated by reference. In some instances, the solid-state thin-film capacitors 1100 are components of effectors of multiplex leads, such as those disclosed U.S. Pat. No. 7,214,189 and U.S. patent application Ser. No. 10/734,490 published as 20040193021 (he disclosures of which patent and Application are herein incorporated by reference). In certain instances, the solid-state, thin-film capacitors 1100 are components of satellites on multiplex leads, such as described in U.S. patent application Ser. No. 11/793,904 published as 20080255647 and Ser. No. 11/794,016 published as 20080312726; the disclosures of which are herein incorporated by reference.

Solid-state thin-film capacitors 1100 of the invention also find use as components of ingestible event marker devices and systems, including those devices disclosed in: PCT Application Serial No. PCT/US2006/016370 published as WO/2006/116718; PCT Application Serial No. PCT/US2007/082563 published as WO/2008/052136; PCT Application Serial No. PCT/US2007/024225 published as WO/2008/063626; PCT Application Serial No. PCT/US2007/022257 published as WO/2008/066617; PCT Application Serial No. PCT/US2008/052845 published as WO/2008/095183; PCT Application Serial No. PCT/US2008/053999 published as WO/2008/101107; PCT Application Serial No. PCT/US2008/056296 published as WO/2008/112577; PCT Application Serial No. PCT/US2008/056299 published as WO/2008/112578; and PCT Application Serial No. PCT/US2008/077753 published as WO2009/042812; the disclosures of which are herein incorporated by reference. In some instances, solid-state, thin-film capacitors 1100 of the invention are components of ingestible event marker (IEM) identifiers. As reviewed in the Applications above, identifiers are components which include an identifier circuitry component. The identifier circuitry component is configured to produce a detectable communication upon contact of the IEM with a target physiological location. The IEM identifier circuitry component may vary depending on the particular configuration and intended Application for which the IEM has been designed, so long as it is activated upon contact of the IEM with a target physiological location, such as a location of the gastrointestinal tract, e.g., mouth, esophagus, stomach, small intestine, large intestine, etc. The identifier circuitry component may be configured to be activated upon contact of the IEM with fluid at the target site, such as stomach fluid. Depending on the needs of a particular Application, the communication generated by the identifier circuitry component may be a generic communication (a communication that merely identifies that an IEM has contacted the target site), or a unique communication (a current signature communication which in some way uniquely identifies that a particular IEM from a group or plurality of different markers in a batch has contacted a target physiological site).

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual aspects described and illustrated herein has discrete components and features which may be readily separated from or combined with the features of any of the other several aspects without departing from the scope or spirit of the present invention. Any recited method can be carried out in the order of events recited or in any other order which is logically possible.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles and aspects of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein. Rather, the scope and spirit of present invention is embodied by the appended claims.

That which is claimed is:

1. A solid-state thin-film capacitor device comprising:
a semiconductor substrate having a first surface;
a thin-film capacitor comprising a first electrode layer, a dielectric layer and a second electrode layer;
the first electrode layer disposed upon the first surface and comprising a transition metal;
the dielectric layer disposed upon the first electrode layer and comprising an oxide of a transition metal;
the second electrode layer disposed upon the dielectric layer and comprising an oxide of a transition metal, wherein the dielectric layer is disposed between the first electrode layer and the second electrode layer;
wherein the first electrode layer and the second electrode layer are in contact with the dielectric layer, and each layer presents an actual surface area at least two times greater than a surface area defined by an orthogonal length dimension and width dimension of the first surface of the semiconductor substrate;
an electrical circuit element positioned within the semiconductor substrate and enclosed by the semiconductor substrate and the first electrode layer, whereby the thin-film capacitor extends from the first surface of the semiconductor substrate and the electrical circuit element is enclosed by the thin-film capacitor and the semiconductor substrate; and
a hermetic sealing structure disposed about the thin-film capacitor and forming a hermetic seal of the thin-film capacitor in combination with the semiconductor substrate.

2. The device of claim 1, wherein the first electrode layer has an actual surface area greater than 50% of the surface area of the first surface of the semiconductor substrate.

3. The device of claim 1, wherein the first electrode layer, the dielectric layer and the second electrode layer each has an actual surface area of greater than 50% of the surface area of the first surface of the semiconductor substrate.

4. The device of claim 1, wherein the first electrode layer has an actual surface area of greater than 90% of the surface area of the first surface of the semiconductor substrate.

5. The device of claim 1, wherein the first electrode layer, the dielectric layer and the second electrode layer each has an actual surface area of greater than 90% of the surface area of the first surface of the semiconductor substrate.

6. The device of claim 1, wherein the thin film capacitor has a capacitance in the range of from 0.01 microfarads to 0.5 microfarads.

7. The device of claim 1, wherein the hermetic sealing structure further encloses the semiconductor substrate.

8. The device of claim 1, wherein the first electrode layer has an average thickness in the range from 0.1 micrometer to 10 micrometers.

9. The device of claim 1, wherein the dielectric layer has an average thickness in the range from 0.05 micrometer to 1.0 micrometer.

10. The device of claim 1, wherein the second electrode layer has an average thickness in the range from 0.1 micrometer to 10 micrometers.

11. The device of claim 1, wherein the transition metal of the first electrode layer is tantalum, the oxide of the transition metal of the dielectric layer is a tantalum oxide, and the oxide of a transition metal of the second electrode layer is manganese dioxide.

12. The device of claim 1, wherein the first electrode layer and the second electrode layer each presents an actual surface in contact with the dielectric layer greater than a surface area defined by an orthogonal length dimension and width dimension of the first surface of the semiconductor substrate.

13. The device of claim 1, further comprising a second thin-film capacitor, wherein the thin-film capacitor and the second thin-film capacitor are connected in series.

14. The device of claim 1, further comprising a second thin-film capacitor, wherein the thin-film capacitor and the second thin-film capacitor are connected in parallel.

15. The device of claim 1, wherein the capacitor device is comprised within an implantable effector device.

16. The device of claim 1, wherein the capacitor device is comprised within an ingestible event marker.

17. The device of claim 1, wherein the surface of the first electrode layer is a porous surface.

18. The device of claim 1, wherein at least one surface of the device comprises surface crenulations.

* * * * *